United States Patent
Yang et al.

(10) Patent No.: US 6,788,532 B2
(45) Date of Patent: Sep. 7, 2004

(54) PORTABLE COMPUTER OF MULTIFUNCTION TYPE

(75) Inventors: Myeong Kyoo Yang, Suweon-si (KR); Joung Sea Park, Seoul (KR); Dong Joon Choi, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/375,073

(22) Filed: Feb. 28, 2003

(65) Prior Publication Data

US 2004/0042168 A1 Mar. 4, 2004

(30) Foreign Application Priority Data

Aug. 29, 2002 (KR) .............................. 10-2002-0051610

(51) Int. Cl.[7] ................................................. G06F 1/16
(52) U.S. Cl. ................. 361/685; 312/223.6; 360/73.02; 439/928.1
(58) Field of Search ................... 361/679–687, 361/724–727; 312/223.1–223.6; 439/928.1; 174/52.1; 360/73.02; 379/88.6

(56) References Cited

U.S. PATENT DOCUMENTS

| 6,188,571 | B1 | * | 2/2001 | Roganti et al. | ............. 361/685 |
| 6,229,695 | B1 | | 5/2001 | Moon | ......................... 361/683 |
| 6,639,792 | B1 | * | 10/2003 | Chang | ......................... 361/685 |
| 2002/0067592 | A1 | * | 6/2002 | Horiuchi et al. | ............ 361/685 |

* cited by examiner

*Primary Examiner*—Hung Van Duong
(74) *Attorney, Agent, or Firm*—Fleshner & Kim, LLP

(57) ABSTRACT

An apparatus (e.g. a portable computer) is provided which includes a peripheral device (e.g. a hard disk) and a bracket. The bracket maybe configured to rigidly attach the peripheral device to the apparatus. Further, the bracket may be configured to guide the peripheral device into electrical contact with the apparatus.

33 Claims, 22 Drawing Sheets

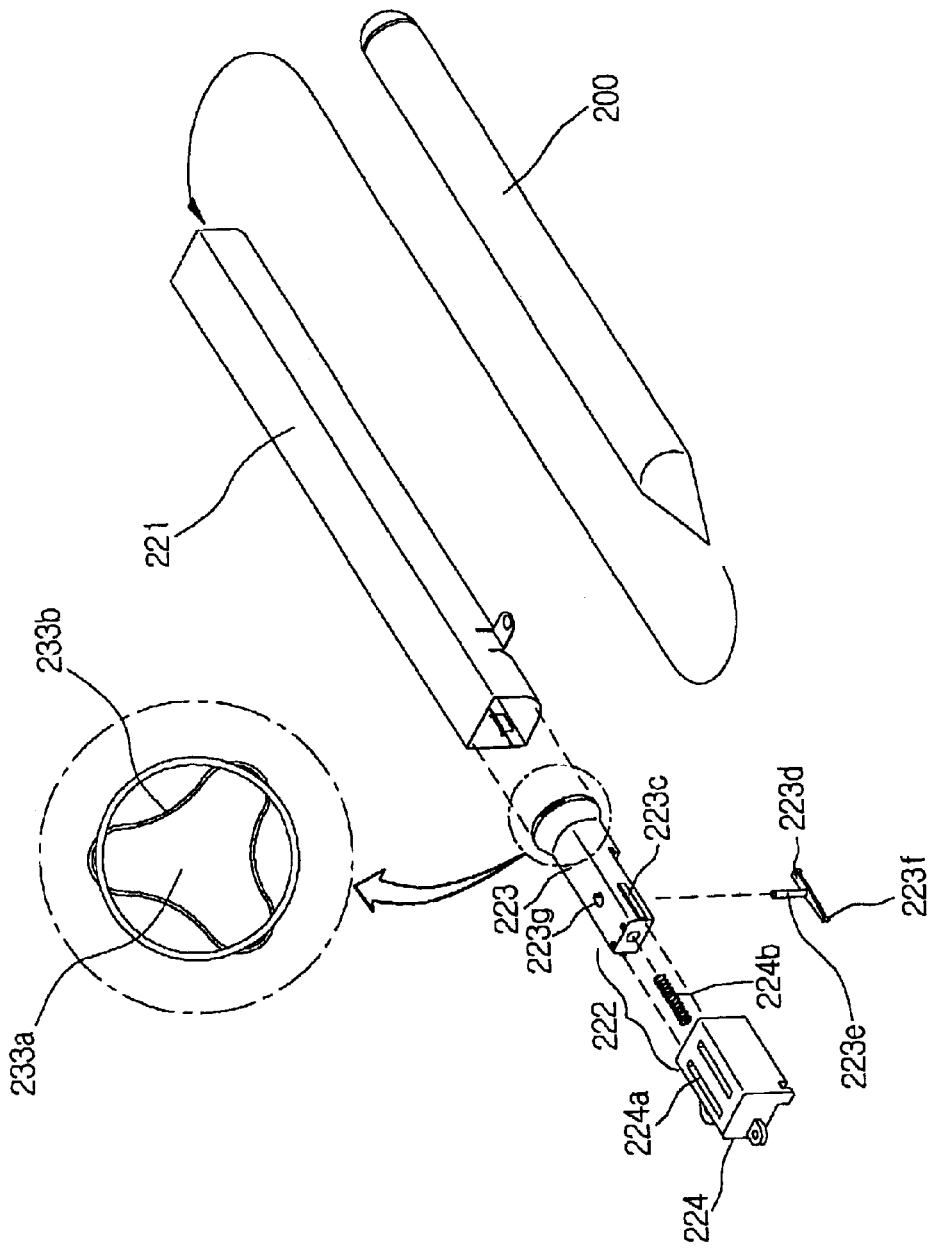

PORTABLE COMPUTER OF MULTIFUNCTION TYPE

BACKGROUND OF THE INVENTION

1. Field of the Invention

The present invention generally relates to at least a portable computer.

2. Background of the Related Art

Computers are part of many people's everyday lives. A basic computer includes many relatively complex components which must work together. Examples of such components are a processor, a hard disk a display, and a keyboard. For many reasons, portable computers are desirable.

Portable computers may be most convenient to users when they have a relatively small size and a relatively simple construction. A larger size portable computer may be burdensome on a user as it is more difficult for the user to transport it. Additionally, portable computers often take additional abuse from their users, because they are routinely transported from one location to another. During this abuse, there is a tendency for components to break making the entire computer inoperable. Accordingly, there is a long felt need to reduce the amount of components needed in a portable computer for both the convenience of the user and the robustness of the portable computer.

SUMMARY OF THE INVENTION

Embodiments of the present invention relate to an apparatus (e.g. a portable computer) including a peripheral device (e.g. a hard disk) and a bracket. The bracket may be configured to rigidly attach the peripheral device to the apparatus. Further, the bracket may be configured to guide the peripheral device into electrical contact with the apparatus.

For example, embodiments of the present invention may include a hard disk that can be attached and connected to a portable computer. A bracket may be provided to secure the hard disk to the portable computer. However, in addition, the bracket may also serve to guide the hard disk so that the hard disk can directly connect to the portable computer. Accordingly, in embodiments, there is no need for an additional connector (e.g. a flexible cable) between the hard disk and the portable computer. These embodiments are advantageous, as the portable computer, including the hard disk, require less components (e.g., a flexible cable between the hard disk and the portable computer is not needed). Accordingly, the weight of the portable computer may be reduced. Further, because a flexible cable between the hard disk in the portable is nonexistent, it cannot break from abuse from the user.

To achieve at least these and other advantages in whole or in part and in accordance with the purpose of the present invention, as embodied and broadly described herein, there is provided an apparatus that includes a peripheral device, and a bracket, wherein the bracket is configured to rigidly attach the peripheral device to the apparatus, and guide the peripheral device into electrical contact with the apparatus.

To further achieve at least these and other advantages in whole or in part and in accordance with the purpose of the present invention, as embodied and broadly described herein, there is provided an apparatus that includes a computer, a hard disk and a unit for rigidly attaching the hard disk to the computer and guiding the hard disk into electrical contact with the computer.

To further achieve at least these and other advantages in whole or in part and in accordance with the purpose of the present invention, as embodied and broadly described herein, there is provided a portable computer that includes a HDD attaching/detaching unit configured to receive a HDD and fastened to a rear cover, the HDD configured with a connector for connection, wherein the HDD is configured to attach to and detach from the HDD bracket, and a plurality of attaching/detaching protuberances and attaching/detaching protuberance guiding grooves formed corresponding to each other on both sides of the HDD and the HDD bracket, respectively, wherein the attaching/detaching protuberance guiding grooves are formed in a "L" shape so that the attaching/detaching protuberances are joined into the attaching/detaching protuberance guiding grooves in a sliding manner.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 9 is an exemplary exploded perspective view of a stylus holder.

DETAILED DESCRIPTION OF PREFERRED EMBODIMENTS

Generally, a notebook computer, portable computer, or a portable digital terminal, is roughly classified into different types. One type is a keyboard pad type where a keyboard is installed with operations performed mainly by the keyboard and pen playing an auxiliary function as a pointing device. The other type is a touch pad type where a computer is taken by one hand and the computer is operated by the other hand or pen taken by the other hand only, so that work may be performed conveniently while moving.

Here, a portable computer denoted by a notebook computer is light in its weight, small in its volume, and easy to carry compared with a general desktop type computer, which provides lots of convenience not obtained at the general desktop type computer. Also, such portable computer has almost no limitation in locations in using a computer, thereby greatly extending utilization scope of a computer.

Figure 1:
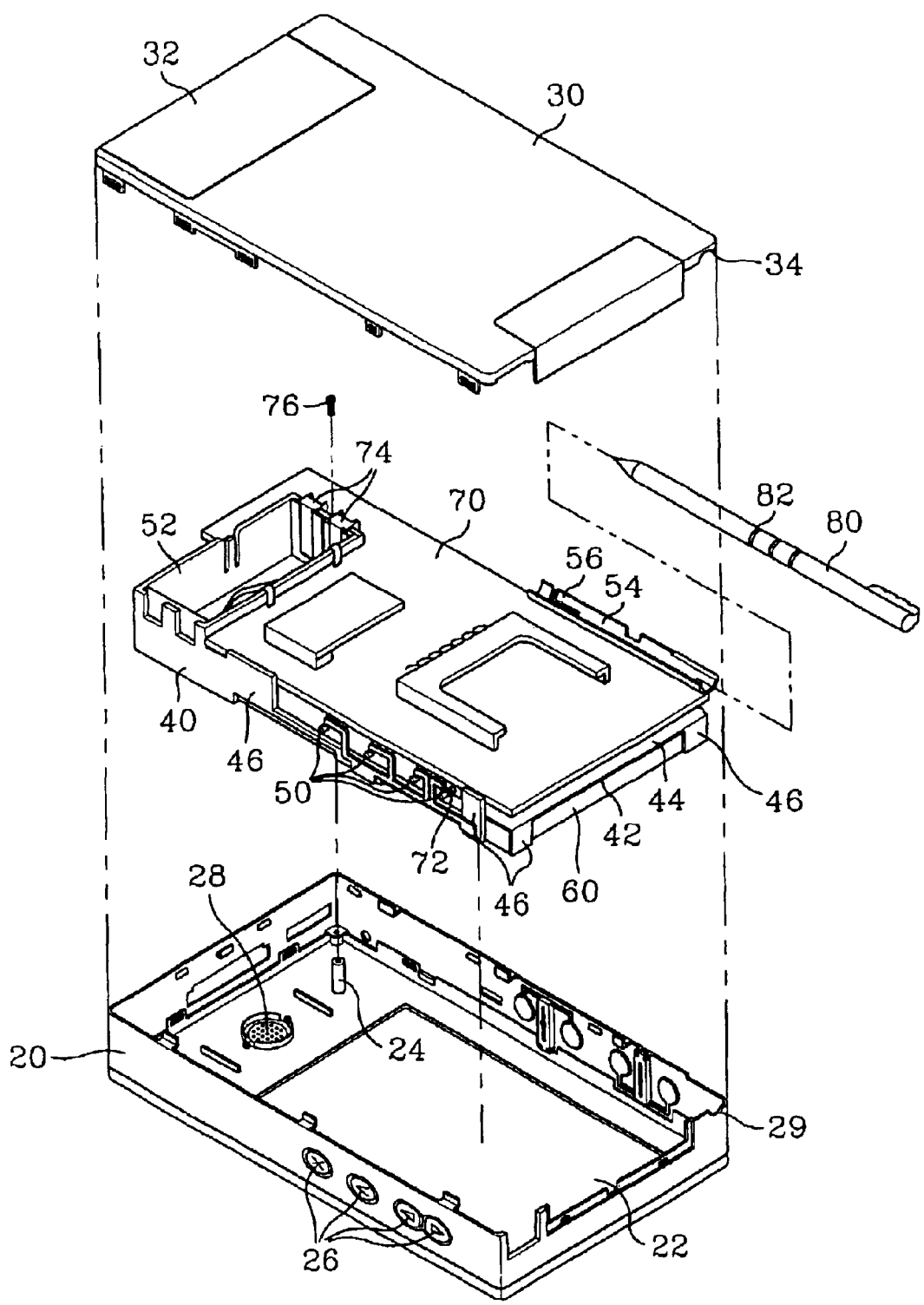
FIG. 1 is an exemplary exploded perspective view of a portable computer having a frame on which a plurality of devices could be mounted.

FIG. 1 is a perspective view of a wallet type PC (Personal Computer). Hardware of a wallet PC includes a front housing 20, a rear housing 30, a frame 40, a screen 60, and a board 70. The frame 40, the screen 60, and the board 70 are installed in an inner space formed by joining of the front housing 20 and the rear housing 30. The screen 60 and the board 70 are joined on the frame 40, and installed in the inner space.

The screen 60 and the board 70 have a structure not directly joined to the front housing 20 or the rear housing 30. Thanks to such structure, impulse is not directly transferred to the screen 60 and the board 70 in case that impulse is exerted on the housings 20 and 30 from the outside. Therefore, such structure could prevent the screen 60 and the board 70 from being destroyed due to impulse from the outside. The frame 40 is configured such that the frame is safely seated between the front housing 20 and the rear housing 30. This frame 40 is joined to the front housing 20 by a screw 76. The screw 76 is joined to a boss 24 formed on the front housing 20 through a fixed rib formed on the frame 40.

In such wallet PC, the frame 40 is configured such that the frame is jointed to the front housing by one single screw 76 only. Also, the frame 40 is possibly configured such that the frame is joined to the rear housing 30 and the frame 40 is possibly joined to the front housing 20 or the rear housing 30 by a variety of methods. The frame 40 has a first plane 42 and a second plane 44 oppositely directed each other. The first plane 42 and the second plane 44 could be one of arbitrary planes on the frame 40. The screen 60 is joined on the first plane 42 and the board 70 is joined on the second plane 44. A display of the screen is exposed to the outside through an opening 22 formed on the front housing 20. For structure to join the screen 60 and the board 70 to the frame 40, a variety of methods could be used.

Generally, a plurality of supporting ribs 46 is used. The supporting ribs 46 are formed from a side of the frame 40. Namely, the supporting ribs 46 are formed from sides of the first plane 42 and the second plane 44. Such structure means that a plurality of devices could be jointed on the frame 40 in a stacking manner. The board 70 could maintain a constant height from the second plane 44, which could be effectively used in case that electronic circuits are installed on both sides of the board 70. Such structure could also be realized by a variety of methods. Ribs 46 are formed on the second plane 44 so that the ribs support the board 70. A battery case 52 is formed on the frame 40 as one body. A battery (not shown) is inserted into the battery case 52. The battery is attached and detached to and from the battery case 52 through a door 32 formed on the rear housing 30.

Speaker mounting portion 28 is formed so that a speaker is installed in an inside of the front housing 20, on which the battery case 52 is positioned. According to such structure, effective use of an inner space of the wallet PC 10 is possible and easy assembling or disassembling of the speaker is possible. The speaker is possibly joined or disassembled through the door 32 without disassembling of the wallet PC 10. Battery terminals 74 could be mounted on the board 70. The battery terminals 74 are directly joined to the battery case 52 when the board 70 is joined to the frame 40.

Switches 72 having a variety of functions could be installed on the board 70. For example, a variety of function buttons are provided, for the wallet PC 10 is realized so that a system may be used through simple operation. These switches 72 are operated by buttons 26 installed on the front housing 20. There is a difficulty of constructing an electronic circuit in a small space, for the wallet PC 10 is manufactured in a small scale. Positions of the buttons 26 for operating the switches 72 are configured such that the positions correspond to the switches 72. The switches 72 should be within a movement range of the corresponding buttons 26. If not positioned in a movement range of the buttons 26, the switches 72 will not operate properly. Mediums 50 are used in case that the switches 72 are not positioned in a movement range of the buttons 26. The mediums 50 are formed together with the frame 40. These mediums 50 are positioned respectively between the switches 72 and the buttons 26. If a user from the outside presses one of the buttons 26 in order to operate a predetermined function, a medium corresponding to that button is operated. Then, a switch corresponding to that medium is operated. Thanks to the mediums 50, the switches 72 are normally operated even in case that the switches 72 are not positioned in a movement range of the buttons 26.

The wallet PC 10 could use a data input method where data is input on the screen 60 through a stylus 80. The stylus 80 is also called a pen or pen stylus. For a stylus input method, a variety of technologies could be used. For example, there is a technology using a conductive stylus for a stylus input method. The conductive stylus is connected to the wallet PC through a cord. The cord has an inner conductor for electrically connecting the stylus and the wallet PC so that writing function on the screen is possible. The wallet PC 10 uses a screen write technology not requiring a cord. The screen used for such technology is also called a touch screen.

The wallet PC 10 could be equipped with the stylus 80 in its inside. The stylus 80 is mounted on a supporter 54 formed on the frame 40. The supporter 54 could be constructed in a variety of forms. The supporter 54 is configured such that an inner plane of the supporter has the same shape as the outer periphery of the stylus 80. The stylus is configured such that the stylus is fixed by a hook 56 when mounted on the supporter 54 so that it may not be detached arbitrarily from the supporter 54. The hook 56 is joined to a groove 82 formed on the outer periphery of the stylus 80, preventing the stylus 80 from being detached from the supporter 54. The hook 56 is formed in a direction the stylus 80 is attached and detached to and from the supporter 54. This hook 56 is formed in form of a free end. Due to such free end structure, the hook 56 could move elastically on an inner plane of the supporter 54. Also, this hook 56 is formed such that the hook is projected in a direction it contacts the outer periphery of the stylus 80.

A first notch 29 is formed on the front housing 20 and a second notch 34 is formed on the rear housing 30. The first and the second notches 29 and 34 form an opening when the front housing 20 and the rear housing 30 are joined. The stylus 80 is attached and detached to and from the supporter 54 through the opening formed by the first and the second notches 29 and 34. The screen 60 and the board 70 of the wallet PC 10 are joined to the frame 40 and positioned in an inside of the wallet PC 10. The screen 60 and the board 70 do not have joining relation with the front housing 20 and the rear housing 30.

The frame 40 is joined to the front housing 20 by one single screw 76 and the screen 60 and the board 70 are supported by the frame 40. For portion on which the screen 60 comes in contact with the front housing 20, an insulating element (not shown) having elasticity could be used. Also, the battery case 52 could be formed together with the frame 40. The battery terminals 74 (refer to FIG. 2) formed on the battery case 52 could be installed on the board 70. The battery terminals 74 are directly joined to the battery case 52 when the board 70 is joined to the frame 40.

In the example illustrated in FIG. 1, however, assembly process in which the screen, the board are jointed sequentially starting from one side (top or bottom case) and the rest case is fastened, is performed. In such process, all parts should be joined at a time during manufacturing process and a problem that all parts should be disassembled in case that repair for only the board or the screen is performed, emerges.

Also, a supporting rib preparing for a collision of a lower case is provided, but it is vulnerable to impulse directly exerted on the screen. Namely, as the screen is exposed to the outside through the opening portion of the wallet PC, there is a strong possibility of inflow of extraneous matter from the outside and a problem of destruction due to a direct impulse, emerges.

Figure 2:
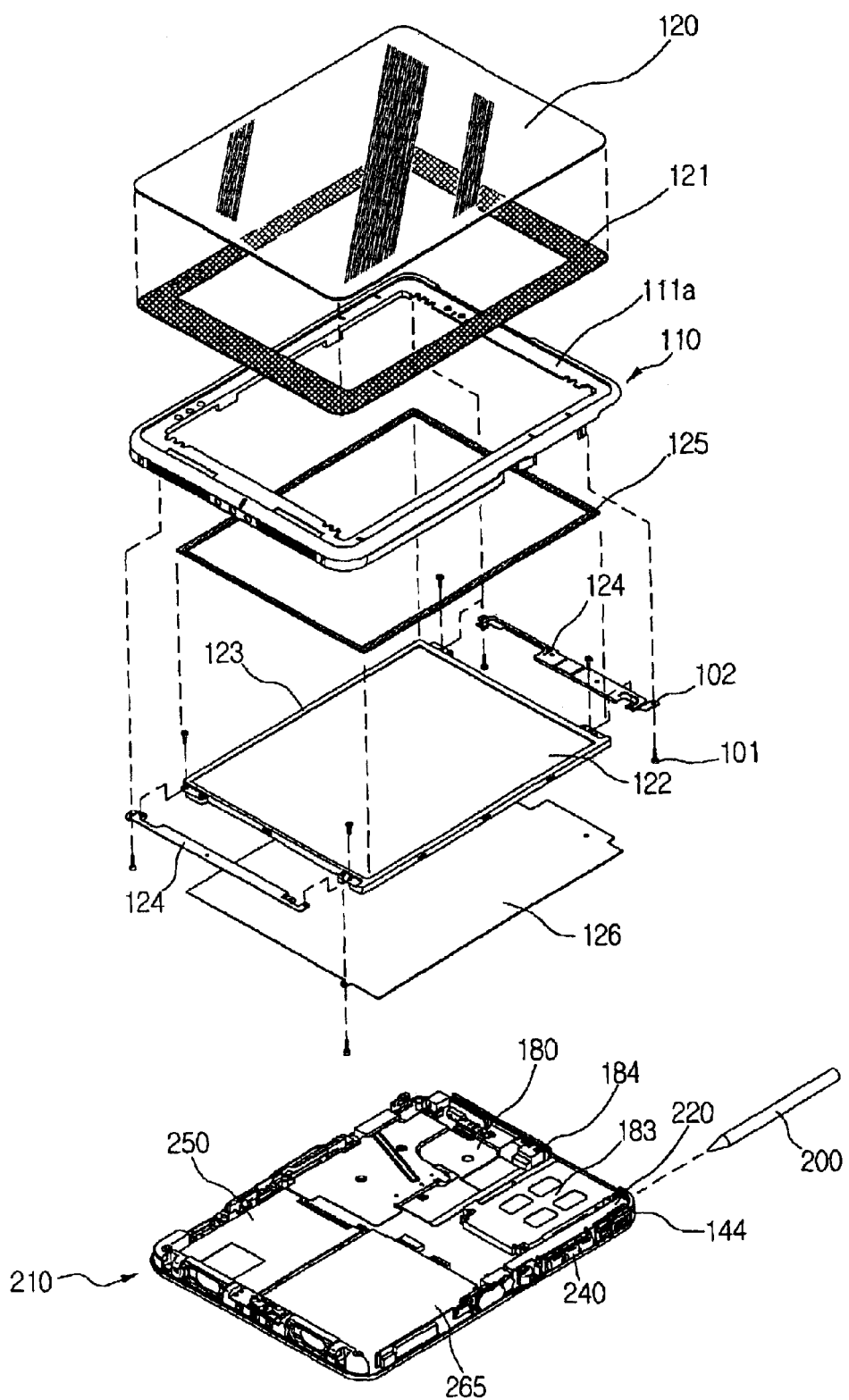
FIG. 2 is an exemplary exploded, perspective view of a portable computer of multifunction type.
Figure 3:
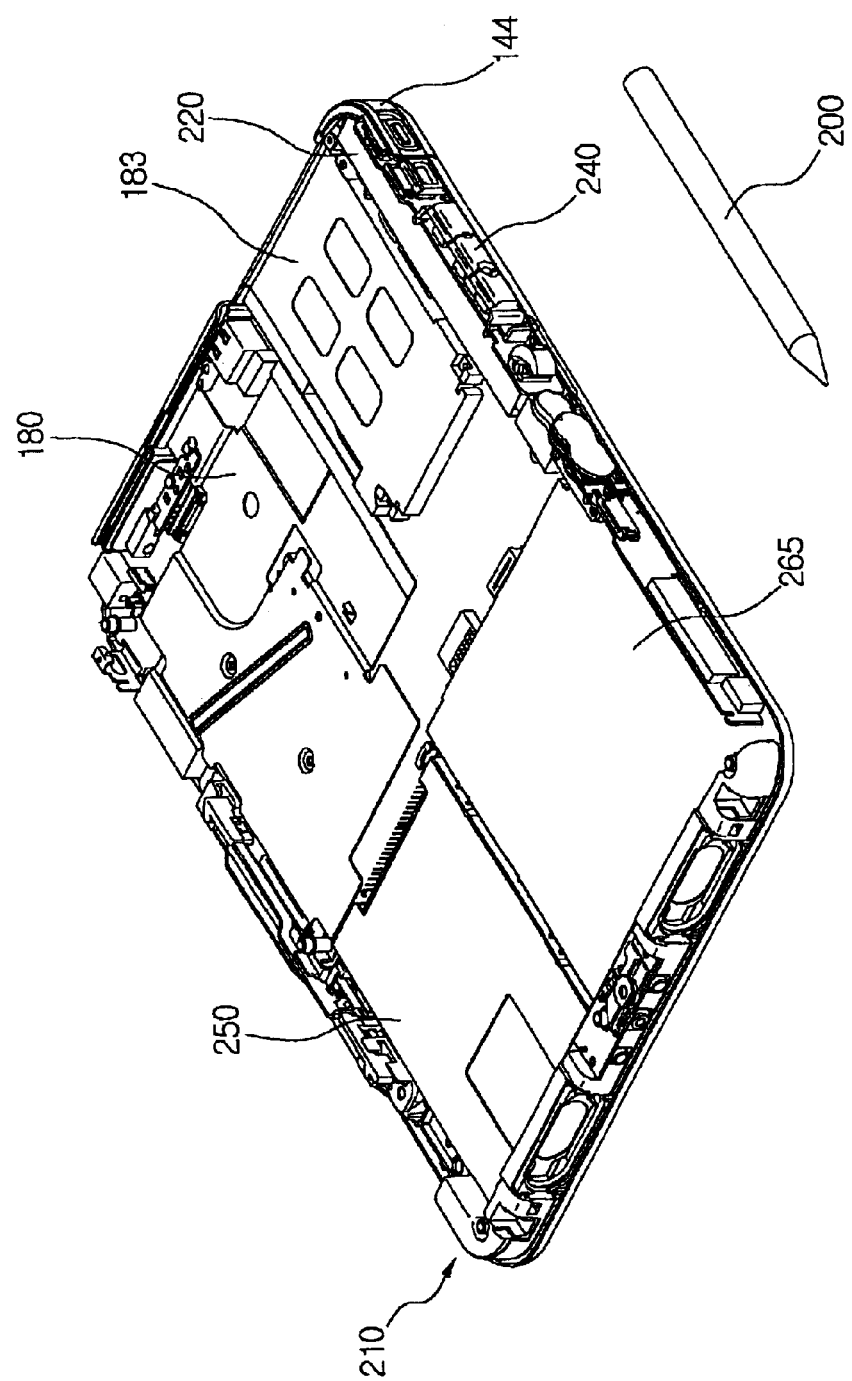
FIG. 3 is an exemplary perspective view illustrating status where a plurality of devices is joined to a rear cover.

FIG. 2 is an exploded, perspective view of a portable computer of multifunction type according to embodiments of the present invention. FIG. 3 is a drawing illustrating a joining status of a rear cover according to embodiments of the present invention. FIG. 4 through FIG. 8 are drawings illustrating joining structures for a button assembly and a power switch according to embodiments of the present invention. FIG. 9 through FIG. 11 are drawings illustrating a stylus holder according to embodiments of the present invention. FIG. 12 through FIG. 19 are drawings illustrating a HDD attaching/detaching unit according to embodiments of the present invention. FIG. 20 through FIG. 23 are drawings illustrating a slope angle adjusting unit according to embodiments of the present invention.

Referring to FIG. 2, embodiments of the present invention can include a tempered glass 120 stuck on an upper portion of a front cover 110 using a double sided tape, a LCD (Liquid Crystal Display) panel 123 and a digitizer 126 stacked within the front cover and joined accordingly and a nonwoven gasket 125 stuck between an edge of the LCD panel 123 and the tempered glass 120. A main board 180 can be provided on one side of an interior of a rear cover 210, and a button assembly 240, a power switch 230 and a stylus holder 220 can be provided on one side of the rear cover, respectively. A HDD (Hard Disk Drive) bracket 250 for receiving a HDD and a battery bracket 265 can be provided on the other side of the interior of the rear cover 210 as one single body.

FIG. 2 illustrates a exemplary joining unit for different kinds of display panels of a portable computer of multifunction type. For convenience, description will be made assuming a portrait direction, in which a longitudinal direction is longer than a width direction, as a default mode. A web pad 100 roughly can include a front cover 110 and a rear cover 210 where the front cover 110 includes different kinds of display panels 122 and 126, a member for protecting and supporting the display panels, and a main board 180 for system operation, a HDD, a battery, a stylus holder 220 are joined on the rear cover 210.

Front cover 110 can be made of plastics and the rear cover 210 can be made of magnesium, whereby heat generated in the inside is protected and weight is reduced. Front cover 110 preferably has an opened inner structure and can have a tempered glass inserting groove 111a on its outer periphery for the tempered glass 120 to be stuck on its front side and for a LCD panel 123 and a digitizer panel 122 to be joined on its interior. On the rear cover 210, preferably a system main machine (a HDD, a main board, etc.) for system driving, a battery bracket 265, a HDD bracket 250, a stylus holder 220 for receiving a stylus 200, buttons 242 and 243 and a power switch 230 can be joined. Here, if extraneous matter such as dust penetrates into the front tempered glass 120 and the LCD panel 123 mounted on the front cover 110, a product quality is deteriorated. Therefore, joining process for the tempered glass 120 and the LCD panel 123 is preferably performed in a clean room in order to prevent or reduce influx of the extraneous matter such as dust into an interior.

FIG. 2 illustrates that the tempered glass 120 is made of transparent material having a predetermined strength and can be stuck on the tempered glass inserting groove 111a of the front cover 110. A double sided tape can be used according to embodiments as an adhesive. The double sided tape 121, which can form a band shape preferably having different widths for its horizontal direction and its vertical direction, can be first stuck on an outer periphery at the back of the tempered glass 120, and then the tempered glass with the doubled sided tape 121 can be stuck and fixed on the tempered glass inserting groove 111a formed on an outer periphery at the front plane of the front cover 110. Therefore, the tempered glass 120 is preferably fastened on the front cover 110 without separate fastening of a screw.

A fixing frame 124 can be joined, for example by a screw 101, to right and left sides of an outer peripheral frame 123 for supporting the LCD panel. A screw hole 102 can be formed on an edge at right and left sides of the outer peripheral frame 123 positioned to face a screw hole 102 of the fixing frame 124, and they are preferably fastened from a front direction to a rear direction of the LCD panel 122 using a screw 101. If a nonwoven gasket is stuck between the LCD panel 122 and the outer peripheral frame 123, and stuck on the front cover 110, then the nonwoven gasket 125 stuck on the LCD panel 122 can get stuck on the doubled sided tape 121 stuck on an edge of the tempered glass 120. Preferably, the LCD panel 122 is fixed on the front cover 110 by fastening of a screw 101 to a boss 111b of the front cover 110 through a screw hole 102 formed on up and down of the fixing frame 124. Here, the double sided tape 121 can unify and fix the tempered glass and the tempered glass inserting groove 111a for external region, while fixing the tempered glass 120 and the nonwoven gasket 125 for internal region.

A front plane of the LCD panel 110 is preferably sealed up by the nonwoven gasket 125 having a predetermined thickness, the double sided tape 121, and the tempered glass 120, so that influx of an extraneous matter from the outside can be reduced or prevented. For stacking of the digitizer panel 126 on a rear side of the LCD panel, the LCD panel 122 and the digitizer panel 126 can be stacked and joined rigidly, for example by screw fastening through the screw hole 102 formed on the frames 123 and 124. According to such fastening structure of the LCD, a screw fastening structure can be covered or not exposed to a front plane of the front cover 110, for the LCD panel 122 is primarily supported by the frame in an inside, and is fastened by a boss in the inside. Also, as the tempered glass 120 is joined to a front plane of the front cover 110, an external impulse is dispersed, not directly transferred to the LCD panel 110, and the double sided tape 121 can play a role of buffering operation to some extent for an external impulse, minimizing or reducing the impulse transferred to the panel. Further, a front and a side portion of the LCD panel 110 are sealed up, so that display portion of the LCD 110 is sealed up, whereby influx of an extraneous matter is reduced or cut off, and accordingly, reliability of a product can be improved.

Preferably, to prevent specific portions of the different kinds of display panels 122 and 126 joined to the front cover 110 from hanging down, a supporting member (not shown) that can have a "L" shape for supporting the central portion of the display panels, can be joined to the front cover 110 by means of a screw 101 or the like when the panels are joined in an interior of the front cover 110, by which a panel joining work can be completed.

In addition, an inverter circuit board and an inverter cable for driving the LCD panel 122 can be connected, and a LCD inverter circuit board and a digitizer controller board are preferably positioned and joined on a rear side of the digitizer 126. Also, an inverter can be installed on an inner side of an upper portion of the LCD panel 122 and the digitizer 126, for providing appropriate voltages, and an auxiliary battery can be electrically connected to the inverter so that the auxiliary battery possibly provides the power supply to the LCD panel 122 for reduced or minimum working in case of replacement of a main battery or battery capacity shortage.

The front cover 110 preferably equipped with such different kinds of display panels 122 and 126 in its inside, can be joined to the rear cover 210, on which a main board 180, a HDD and a battery electrically coupled to the main board can be joined together. The HDD and the battery are preferably joined to a HDD bracket 250 and a battery bracket 265, respectively. Also, a stylus holder 220 for receiving and providing a stylus 200 can be installed on the rear cover 210, and a button assembly 240 including buttons for a variety of function control and a switch can be joined on at least one side of the rear cover 210.

On a lower end of the main board 180 mounted on the rear cover 210, a disk drive socket for interfacing with a CD-ROM drive and a floppy disk drive can be electrically coupled. In case that the disk drive socket is not used, a socket protecting lever that can be opened when a drive connector is connected and that can be closed when the drive connector is disconnected, is preferably provided in order to prevent or reduce influx of an extraneous matter from the outside.

The main board 180 can include (e.g., on its upper right side) a PCMCIA (Personal Computer Memory Card International Association) card receiving portion 183, a USB (Universal Serial Bus) port, respectively and can have on its central portion, a serial communication port, a communication port 184 including a LAN (Local Area Network) port electrically connected, and on its right side, a DC (Direct Current) input jack, and IrDA (Infrared Data Association) port for an infrared communication. Additionally, a port cover for protecting the communication port can be provided. The rear cover 210 can have (e.g., on its upper right side) the button assembly 240, the stylus 220, and can have a HDD attaching/detaching unit on one side of its lower portion, and can have a slope angle adjusting unit on the upper portion of its rear plane. Description of joining structures related to the foregoing construction, will be made in the following.

FIGS. 4–8 illustrate an exemplary joining structure of the button assembly. The button assembly 240 can be joined to an upper right side of the rear cover 210, and the stylus holder 220 for receiving the stylus 200 can be joined on an inner side of the button assembly 210. A plurality of function buttons can be joined on a right upper end of the button assembly 240. Such function button can include press operation units including a power switch, a quick button, a Tap button, an Esc button, a personal information management button 242, and a rotation operation units such as a jog switch 243. The jog switch can move up and down directions with a center as reference, performing a level adjustment and menu scrolling through an enter for OSD adjustment, and up and down functions corresponding to up and down directions. Also, the personal information management button, one of function buttons, can operate as a pop-up menu upon power off or execution of other program, providing information of the pop-up menu on the screen. For such pop-up menu information, personal information of a user or scheduling information can be included.

As shown in FIG. 3, the power switch 230 can be joined to a fourth curved surface on a right upper end of the rear cover 210, and a pen through hole 220a through which the stylus 200 received into the stylus holder 220 can pass, is preferably formed on an upper end surface of the rear cover 210. The button assembly 240 includes a button cover 241 having a plurality of function buttons on its right upper portion and a button substrate 244 having a plurality of contact point switches. On the button cover 241, function buttons such as buttons including a power button, a quick button, a Tap button, an Esc button, a personal information management button, and a jog dial 243, can be formed. Each button is preferably given a predetermined elastic force by the joining structure.

A variety of function buttons 242 can be formed as one body on the button cover 241, and the jog dial 243 can be separately joined. On the button cover 241, a substrate fixing hook 245 for being joined to the button substrate 244, can be formed, and a first hook hooking groove 246 projected inward, a second hook hooking threshold 247 can be formed on a lower end of the button cover 241, respectively. Also, a safely seating groove 248 can be formed on one side of the button cover 241. On the button substrate 244 corresponding to the button cover 241, a hooking groove 244a can be formed. A first and a second hook 246a and 247a formed in zigzags can be formed on the rear cover 210 on which the button assembly 240 is joined, and a safely seating protuberance 248a for being joined to the safely seating groove 248, can be formed on right and left sides of the rear cover 210.

With such configuration, if the button substrate 244 is stuck on the button cover 241 upon joining of the button cover 241 and the button substrate 244, the substrate fixing hook 245 formed on the button cover 241 is hooked and joined at a hooking groove 245a of the button substrate 244, and each function button on the button cover 241 corresponds to each contact point switch on the button substrate 244. The jog dial 243 can also be joined so that the jog dial corresponds to a jog contact point switch.

Figure 5:
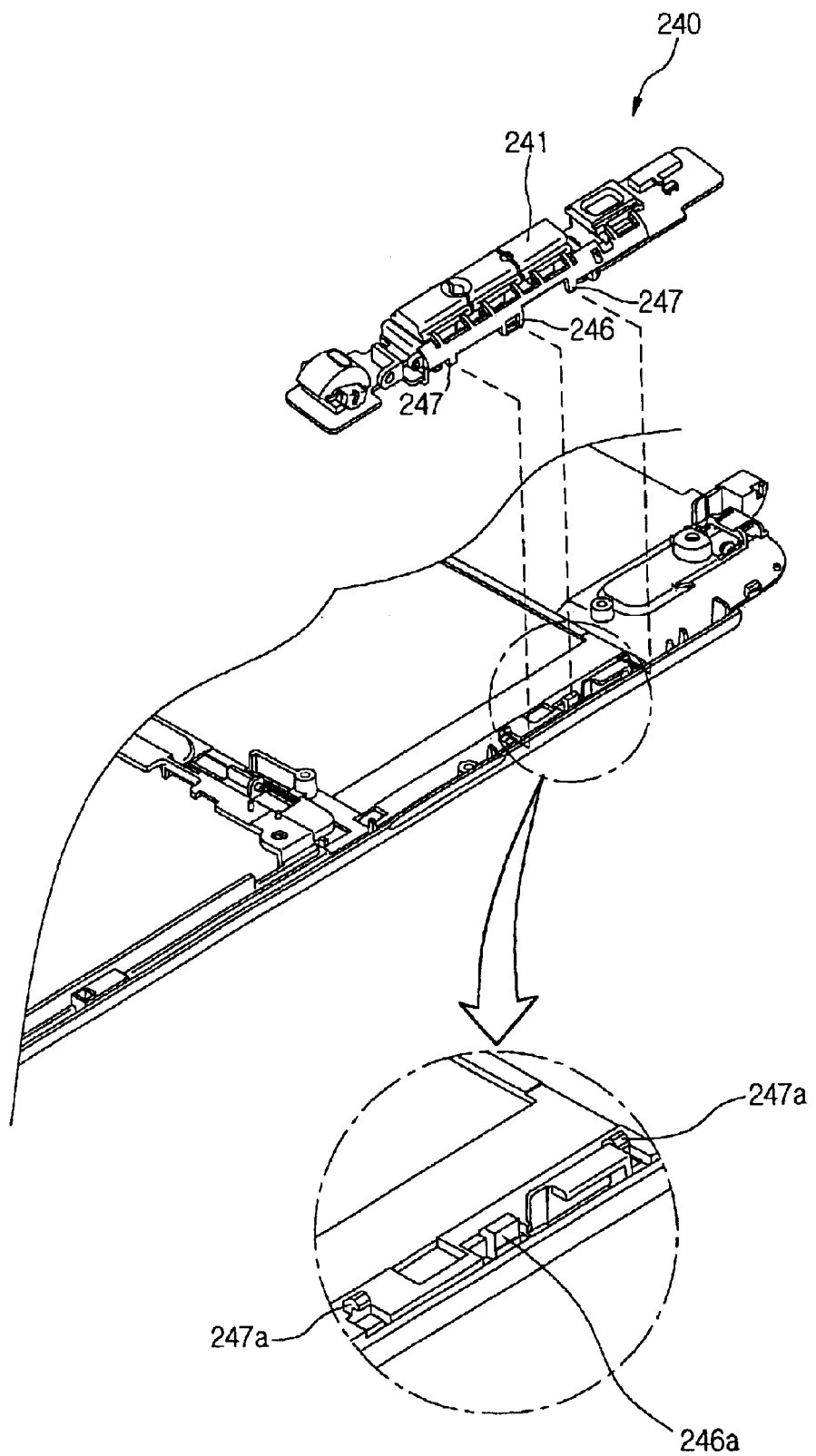
Figure 6:
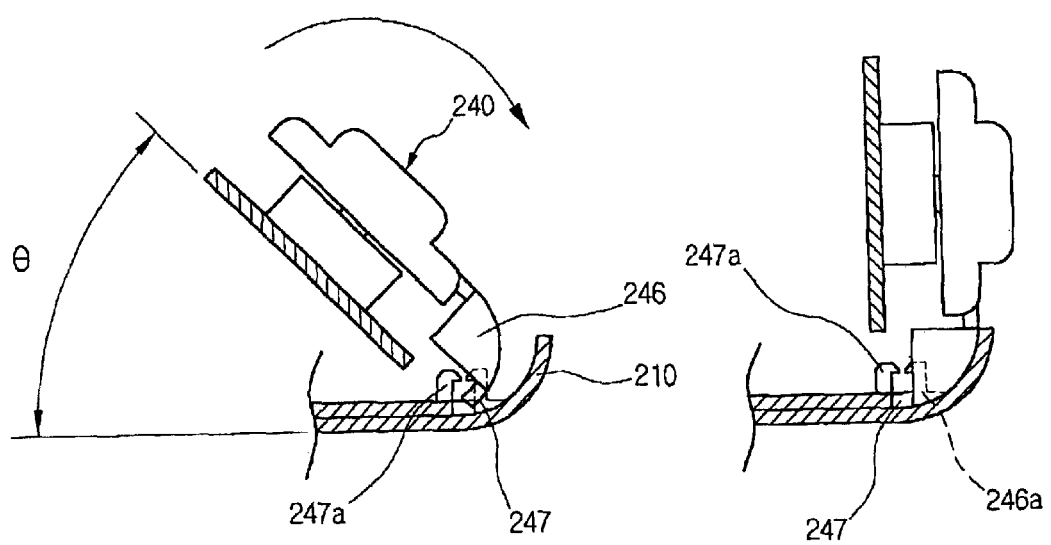
FIG. 6 is an exemplary drawing illustrating a status before and after joining of a button assembly.

Such button assembly 240 can be positioned on the rear cover 210 as shown in FIG. 5, then the button cover 241 can be inclined as much as a predetermined angle (e.g., θ=30 degrees), then joined to a joining portion of the rear cover 210. Further, the first hook hooking groove 246 projected inward on a lower central portion of the button cover 241 can be hooked at the first hook 246a projected inward on a central portion of the rear cover 210. After that, if the button cover 241 is erected upright, the second hook hooking threshold 247 of the button cover 241, can be hooked at the second hook 247a projected outward on right and left sides of the first hook 246a.

For example, the first hook hooking groove 246 and the second hook hooking threshold 247 can be projected inward on the same line, spaced by a predetermined interval at a lower end of the button cover and accordingly, the first hook 246a and the second hook 247a can be formed in zigzags so that supporting force can be generated between them upon joining. Since the first and the second hooks 246a and 247a can be formed on the rear cover 210 by injection molding using molybdenum, function as a fastener or joining device can be achieved using a simple die without much use of screw fastening. The safely seating protuberance 248a projected upward from the rear cover 210 can be fit into the safely seating groove 248 formed on one side of the button cover 241, and a screw can be fastened at a screw through hole, whereby the button assembly is preferably fixed together with a joining portion of a hooking manner. The power switch 230 can include a tension protuberance groove 233 projected inward, a hook 234 formed on both sides of the groove 233, and a tension bar 235 formed obliquely, extended to a left side from the tension protuberance groove 233.

Figure 4:
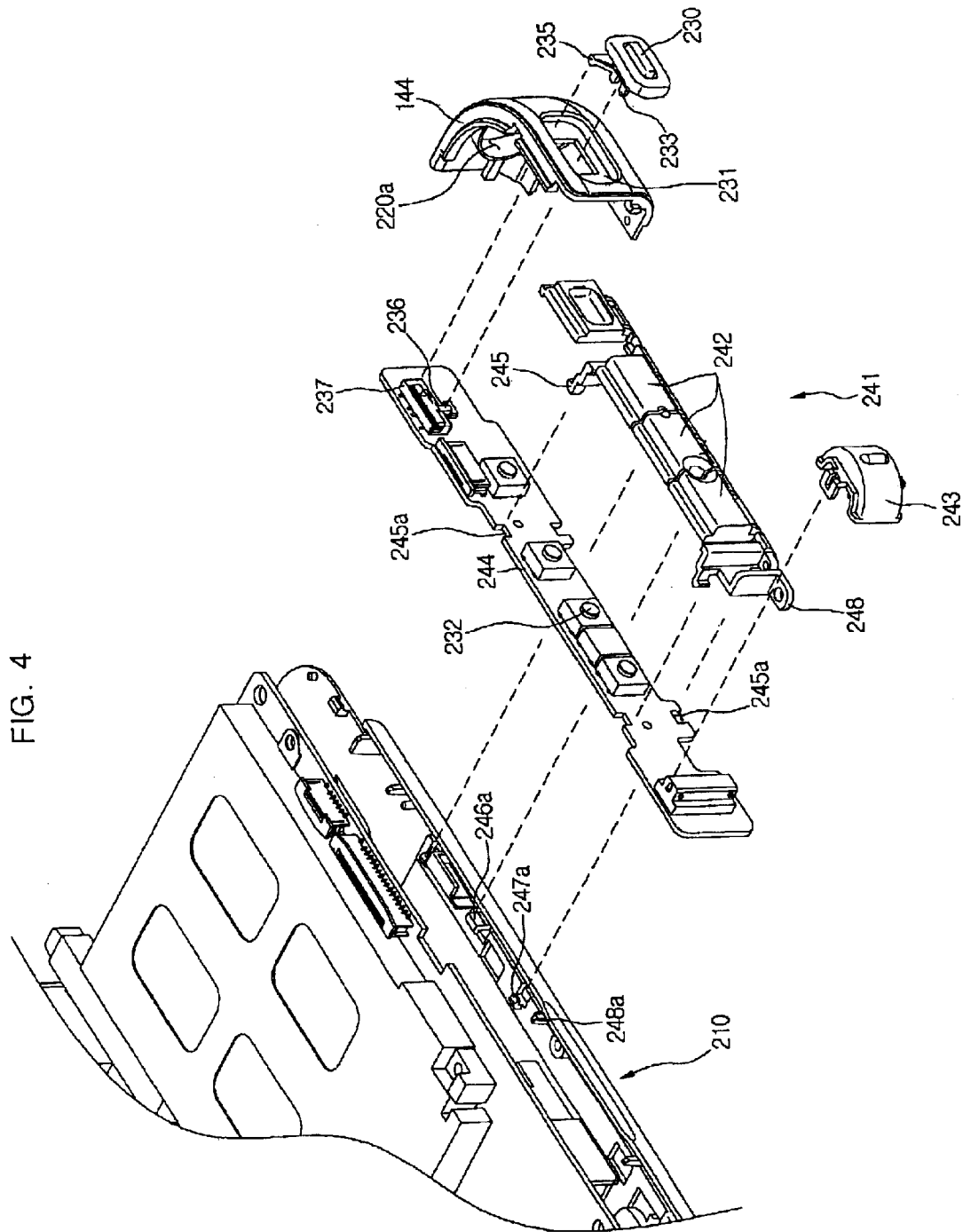
FIG. 4 and FIG. 5 are exemplary exploded, perspective views of a button assembly.
Figure 7:
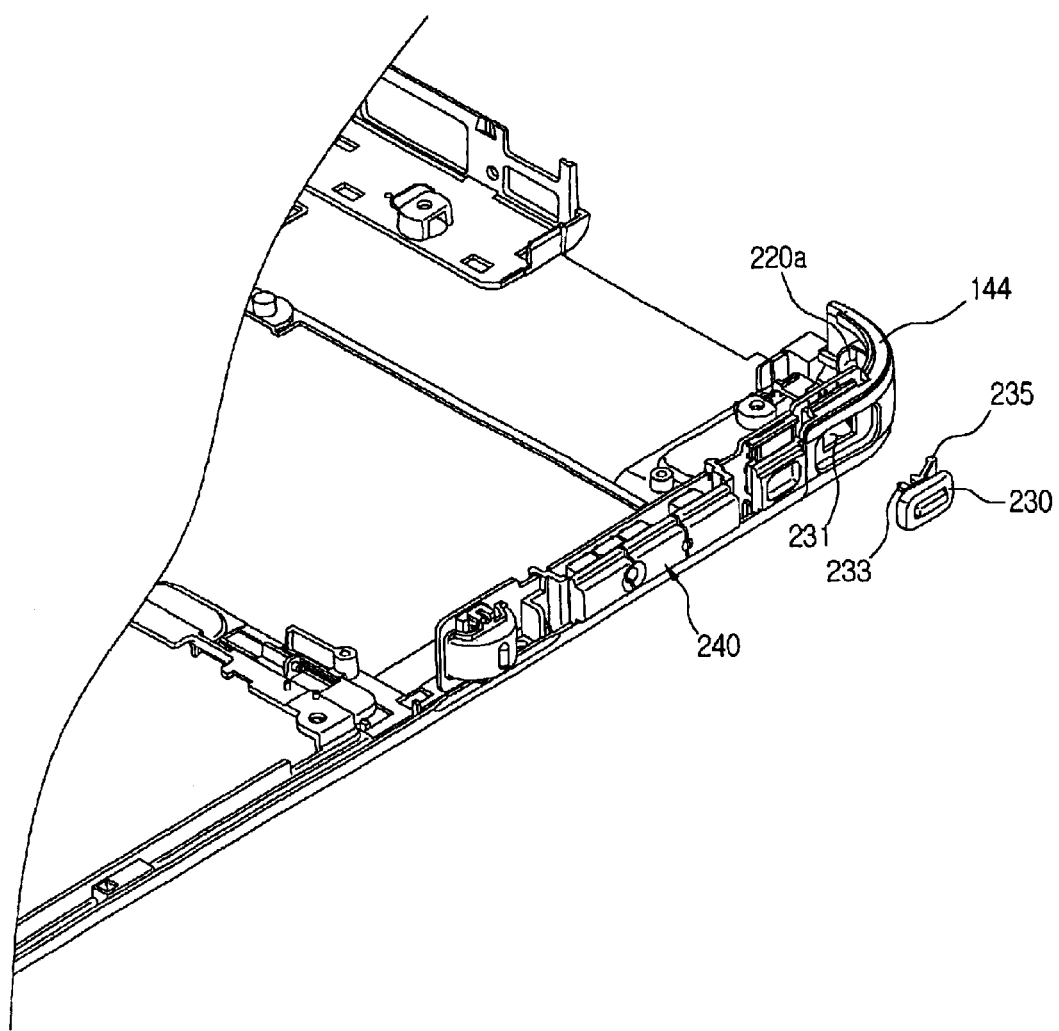
FIG. 7 is an exemplary exploded perspective view of a power switch.
Figure 8:
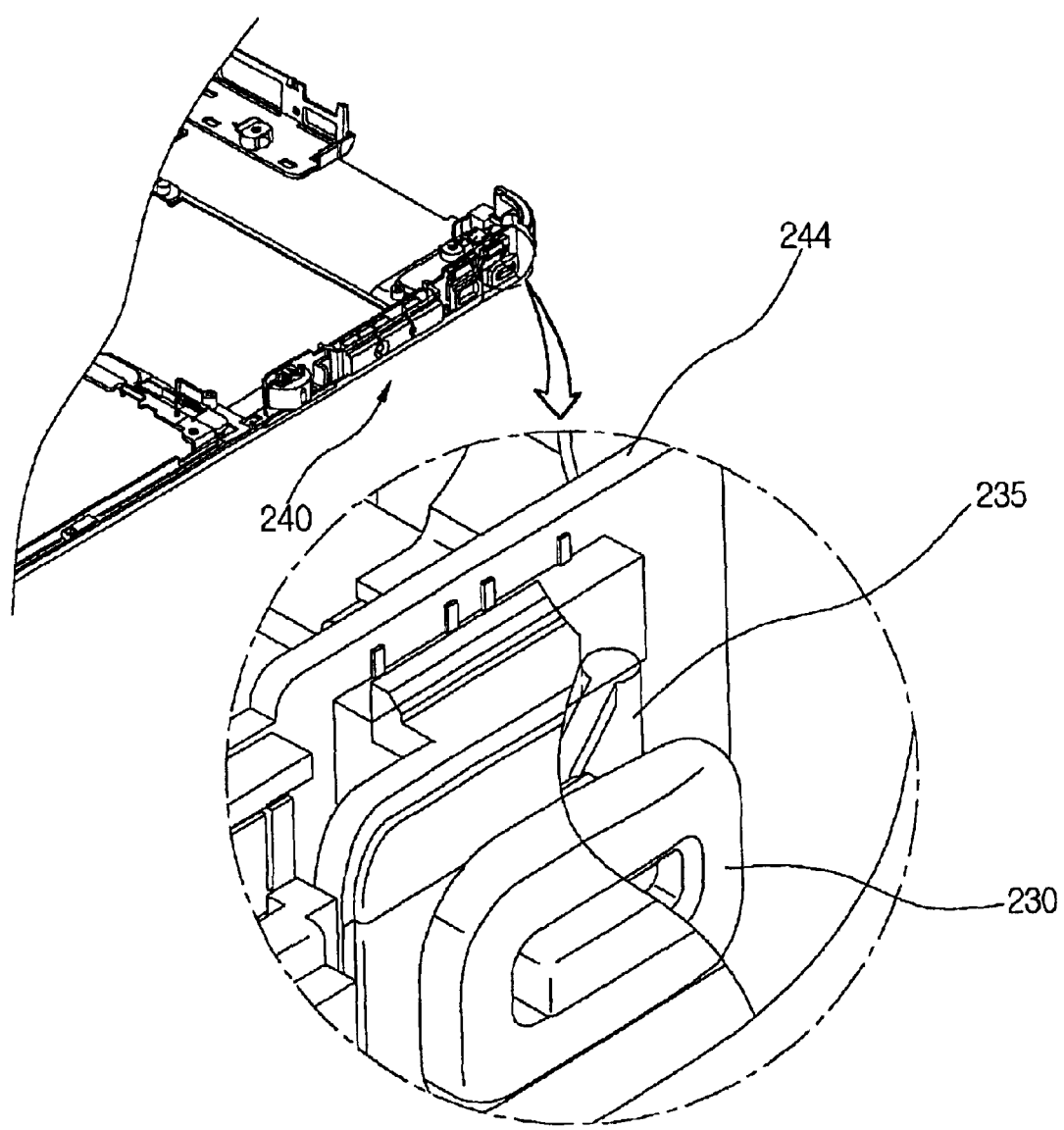
FIG. 8 is an exemplary drawing illustrating a status for joining of a power switch.

As shown in FIG. 7, if the power switch 233 is fit and joined through a power switch guiding groove 231 of a curved surface assembly 144, the hooks 234 preferably formed on both sides of the power switch 233 can be fit and hooked at the power switch guiding groove 231, and the tension protuberance groove 233 projected inward on the power switch 233 can be fit in a tension protuberance 236 on the button substrate 244 so that joining for the power switch 233 is completed. As shown in FIG. 4, the tension protuberance 236 can cooperate with a spring inserted within one side of the button substrate.

With such status, in case that the power switch 233 is turned on/off, if the power switch 233 is pushed to the right side, with being somewhat pressed, then the power switch 233 is moved to the right side along the power switch guiding groove 231 and, at the same time, the tension protuberance 236 fit into the tension protuberance groove 231 moves, pressing the spring, and the tension bar 235 formed on an inside of the power switch comes into plane contact with the button substrate 244, thereby acquiring a predetermined elastic restoring force. Accordingly, the power switch is point contacted, whereby function control is possibly achieved.

Preferably, to inform operation status of the power switch 230, a light emitting diode is turned on/off, and the light emitting status can be radiated to the outside through the transparent power switch. Also, the tension protuberance 236 is moved back to a reverse direction (e.g., left side) by the restoring force of the pressed spring 237, which can move back the tension protuberance groove 233 to the original position and, at the same time, can play an assistant role in moving back the power switch to the original position with the help of the elastic restoring force transferred to the tension bar 235 formed on one side of the tension protuberance groove 233.

FIGS. 9–11 illustrate the holder 220 for receiving the stylus 200. In order to receive the stylus 200, as shown in FIG. 2, the stylus holder 220, a variety of function buttons, and jog switch are preferably joined to an upper right side of the rear cover 210. Also, the power switch is preferably installed on a right side of the curved surface assembly 144 on the upper right side of the rear over, and the pen through hole 220a through which the stylus 200 received in the stylus holder 220 possibly passes, is preferably formed on an upper end of the rear cover.

As shown in FIG. 9, the stylus holder 220 can include a pen case 221 through which the stylus can pass, a pen tip pressing part 223 inserted in an end of the pen case 221, for pressing a pen tip and a push-push button that can include a push button 224 fixed at the rear cover, for transferring pressing/restoring force caused by elastic force to the pen tip pressing part 223.

Operations for receiving the stylus in a stylus holder will now be described. When the stylus 200 passes through and is inserted into the pen through hole 220a formed on the curved surface assembly 144 and the pen case extended from the pen through hole, then the inserted pen tip of the stylus 200 can press the pen tip pressing part 223 of the push-push button, and can be accordingly received. The pen tip pressing part 223 can have a pen tip receiving groove 223a in its interior, and if the pen tip is received in the pen tip receiving groove 223a, a pressing bar 223b preferably installed on the inner periphery of the pen tip receiving groove 223a presses and supports the pen tip of the stylus 200 by a predetermined elastic force.

Figure 10A:
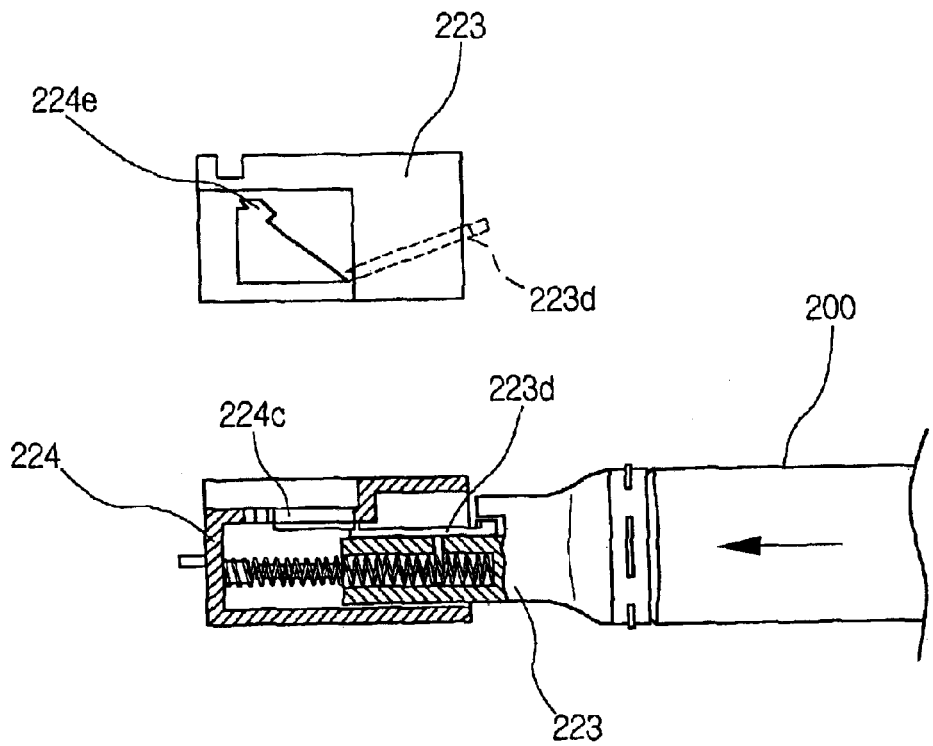
FIGS. 10(a)–(b) are exemplary drawings illustrating a status for operation of the stylus holder.
Figure 11A:
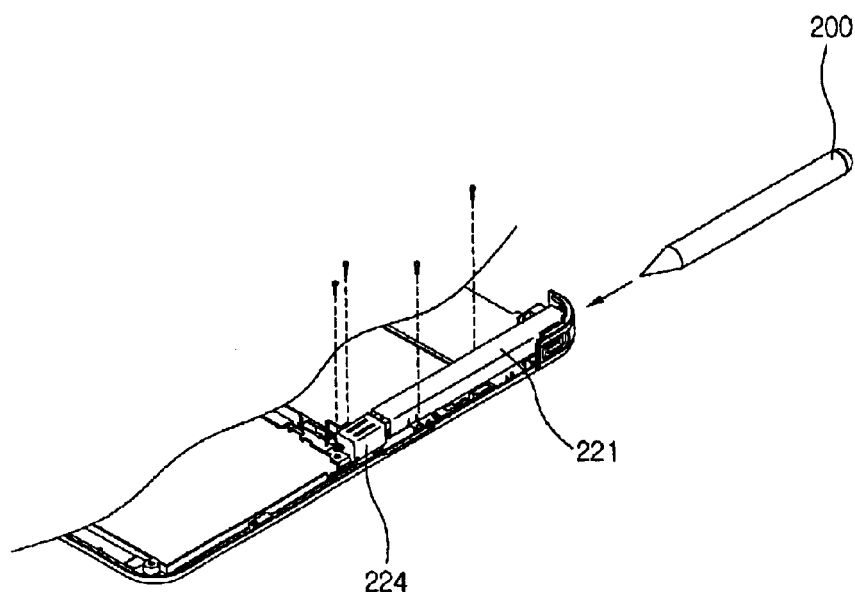
FIGS. 11(a)–(c) are exemplary drawings illustrating a status for receiving/providing of the stylus.

As shown in FIGS. 10(a) and (b), the pen tip pressing part 223 can operate in a push-push manner every moment external force is exerted on the push button part 224, receiving and providing the stylus through the stylus holder 220. A spring 224b for pressing and restoring can be installed between such pen tip pressing part 223 and the push button part 224 so that the pen tip pressing part 223 moves back and forth, and a groove 224a and a protuberance 223c for guiding function can be formed right and left sides of the pen tip pressing part 223 and the push button part 224, to guide back and forth movements of the pen tip pressing part 223.

Figure 10B:
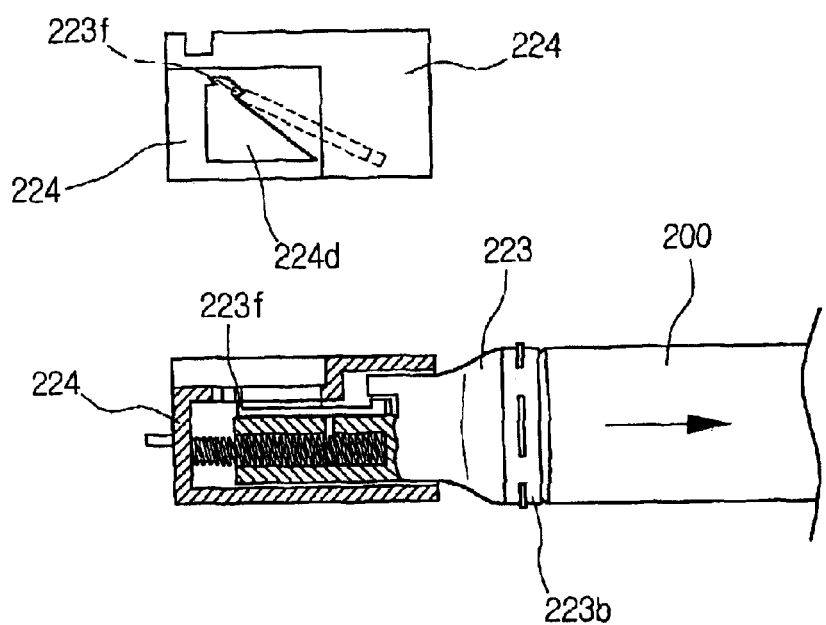

Upon reception of the stylus 200, if the pen tip pressing part 223 to which a pen tip is joined, is pushed back completely by the groove 224a and the protuberance 223c, then the pen tip pressing part 223 can be joined to the push button part 224 and the inner spring 224b can be pressed. A stopping protuberance 223d rotating on one side of the pen tip pressing part 223 can then hook at a stopping groove 224e formed on an end of the push button part 224 along an inner guiding threshold 224c so that the pen tip pressing part 223 can be stopped, as shown in FIG. 10(b).

Figure 11B:
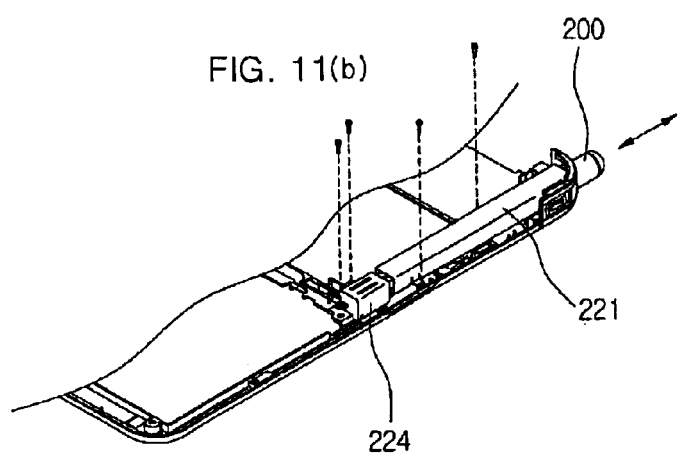
Figure 11C:
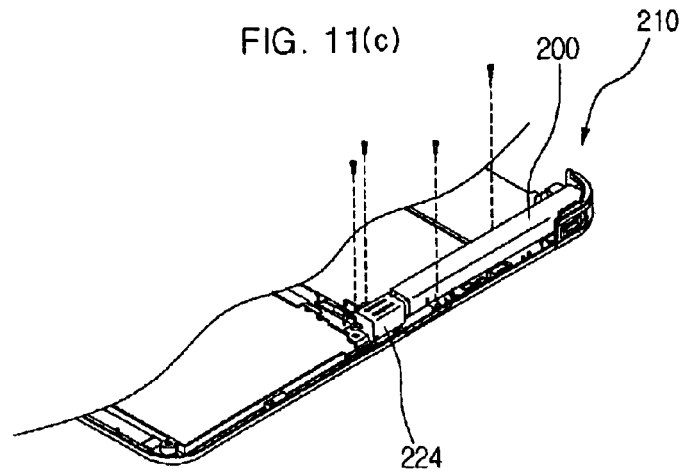

Upon withdrawal of the stylus 200, if the stylus 200 inserted into the stylus holder 220 is pushed again, then the pen tip pressing part 223 in which the pen tip is received, is pushed in reverse direction. The stopping protuberance 223d hooked at the stopping groove 224e can be detached and the pen tip pressing part 223 can move in a forward direction from the push button part 224, so that the stylus is pushed forward to the extent that a user could take the stylus by the hand, whereby the stylus can come out as shown in FIG. 11(b).

The stopping protuberance 223d of the pen tip pressing part 223 can be of a "T" shape, and a vertical rotational shaft 223e of a semicircle shape, can be inclined in a semicircle shape of preferably approximately 45 degrees and fit into an interior within which the spring 224b is installed and fit in the middle of the spring accordingly. For a horizontal stopping bar 223f, a protuberance preferably projected upward on a front end of the stopping bar 223f is guided along the inner guiding threshold 224c on the push button part 224, then can hook at the stopping groove 224e of a "V" shape. Conversely, if external force is exerted on the pen tip pressing part 223, the protuberance can be detached from the stopping groove 224e so that the pen tip pressing part 223 can be moved forward again to the original position along an outer peripheral plane of the guiding threshold 224c.

As shown in FIG. 10(a), in case that the stylus 200 is mounted, if the stylus 200 passes through the pen case 221, then the pen tip part of the stylus 200 is inserted into the pen tip pressing part 223 of the push-push button 222 and fixed. The pen tip pressing part 223 is pushed inward by external force, and can be inserted into the push button part 224. The rotational shaft 223e of the stopping protuberance rotates and can get twisted by 45 degrees, and the stopping protuberance 223d projected on the end of the pen tip pressing part 223 can be guided by the guiding threshold, then is hooked at the stopping groove 224e of the push button part 224 and is thereby fixed. The inner spring 224b can be inserted between the pen tip pressing part 223 and the push button part 224 so that elastic force is transferred between them.

As shown in FIG. 10(b), in case that the stylus 200 is withdrawn, if the stylus 200 is pushed inward one time, then the pen tip pressing part 223 to which the pen tip is joined, is pushed in a direction toward the push button part 224, and the stopping protuberance 223d is preferably detached from the stopping groove 224e. The pen tip pressing part 223 is moved forward, pushed by elastic force exerted between the pen tip pressing part 223 and the push button part 224, which pushes the stylus 200 to an initial reception position at a front end of the stylus holder 220, whereby the stylus 200 comes out to the outside to the extent that a user could take the stylus by the hand.

For embodiments of such push-push operation, push-push operations by which stylus 200 is received in and comes out from the stylus holder 220, is possibly configured such that the power switch cooperates with the push-push operation. Namely, a power switch could be installed in an interior of the push button part 224, and operate with the pen tip pressing part 223 upon reception and withdrawal of the stylus, whereby the power switch can also be turned on/off.

FIG. 12 through FIG. 20 are exemplary illustrations of an attaching/detaching structure and an insulating and separating structure for a HDD. HDD may be attached to rear cover 210. A HDD attaching/detaching unit may comprise HDD bracket 250, HDD 254 received in HDD bracket 250, and/or a HDD cover 255.

HDD bracket 250 may have HDD receiving groove 253 receiving HDD connector 181. HDD bracket 250 may have an attaching/detaching protuberance guiding groove 251 for attaching and detaching HDD 254 Attaching/detaching protuberance guide groove 251 may have an "L" shape. Hook 252, safely seating groove 257, and screw through hole 259 may be provided. HDD bracket 250 may be joined to rear cover 210. Hook hooking groove 252a may be for hooking hook 252 of HDD bracket 250. A safely seating protuberance (not shown) may be formed proximate to HDD bracket joining hole 250a.

HDD bracket 250 may be joined to HDD bracket joining hole 250a. HDD bracket 250 may be fit into HDD bracket joining hole 250a in a forced fitting manner. Hook 252 of HDD bracket 250 may be hooked at hook hooking groove 252a and safely seating grooves 257 may be fit in the safely seating protuberances. HDD bracket 250 may be fastened and fixed by screw 258 through screw through hole 259. Screw hole 259a may be oriented in an inside portion in order to be fixed on rear cover 210.

HDD 254 may be joined to interior HDD receiving groove 253 of HDD bracket 250. Attaching/detaching protuberance 254a may fit in attaching/detaching guiding groove 251 and may be moved forward in a sliding manner along the attaching/detaching guiding groove 251. Accordingly, HDD 254 may slide forward so that a male connector 254b of HDD 254 connects to female connector 181 of main board 180. For example, HDD attaching/detaching protuberance 254a may be inserted along a vertical portion of attaching/detaching protuberance guiding groove 251 having an "L" shape. HDD 254 may be pushed forward along attaching/detaching guiding groove 251. HDD male connector 254b may connect to female connector 181 to connect to main board 180. Accordingly, HDD may be received in a HDD receiving unit without fastening of a screw. Further, direct connection between connector 181 of main board 180 and male connector 254b of HDD 254 is possible without a separate cable.

Figure 12:
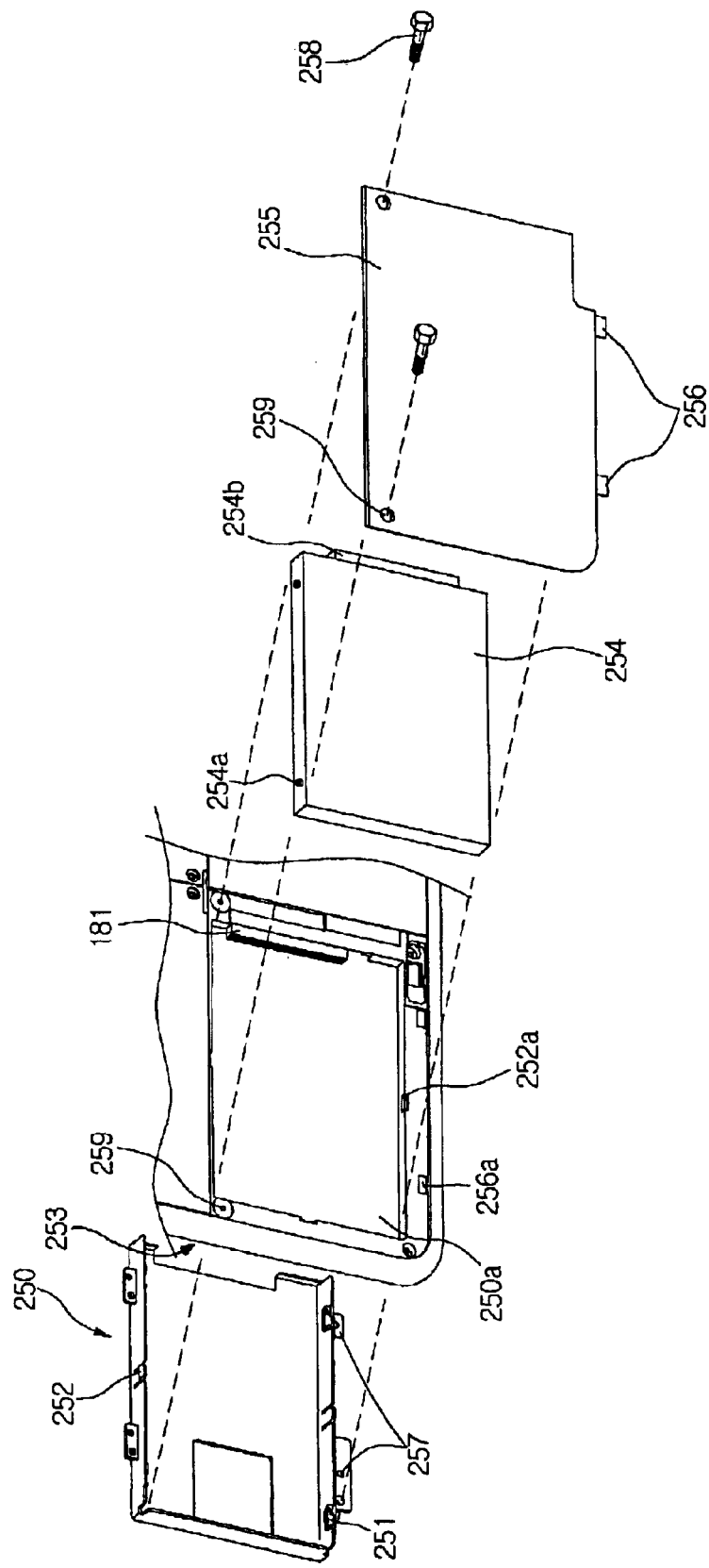
FIG. 12 and FIG. 13 are exemplary exploded perspective views illustrating an attaching/detaching unit for a hard disk.
Figure 13:
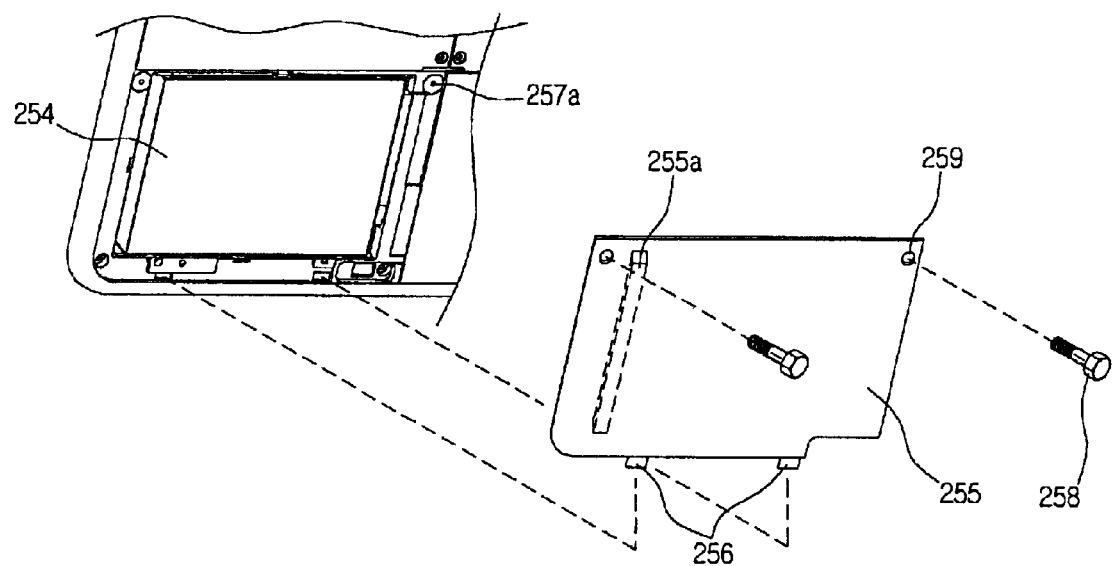
Figure 14:
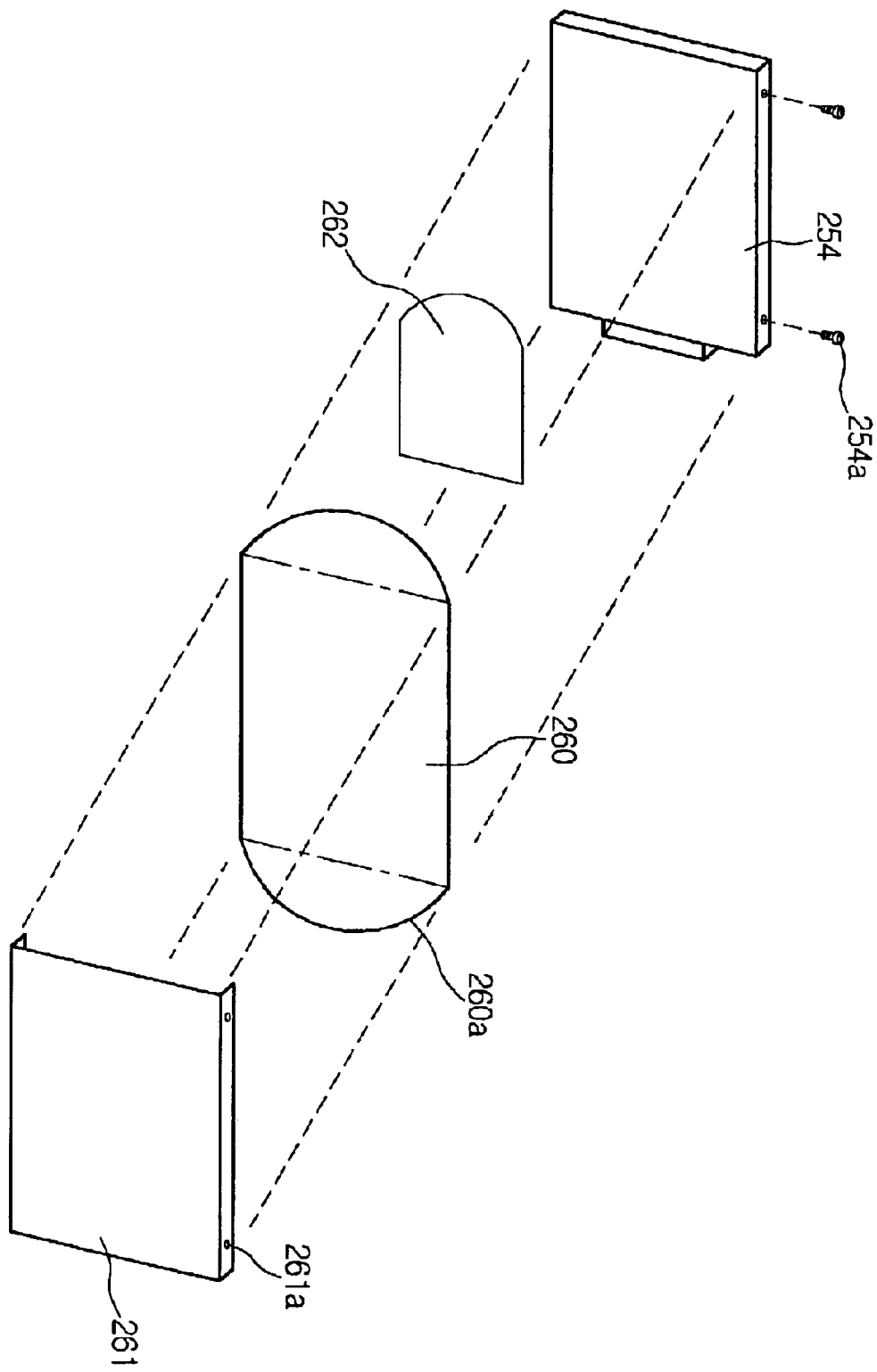
FIG. 14 is an exemplary exploded perspective view for insulating and separating structure of a hard disk.

Length of HDD receiving groove 253 may be the same as the sum of the length of HDD 254 and the length of attaching/detaching protuberance guiding groove 251. If HDD 254 is joined completely, a space may remain at a rear portion of the HDD receiving groove 253. The length of the remaining portion may be as much as the length of attaching/detaching protuberance guiding groove 251. FIG. 12 illustrates that HDD 254 may be covered by HDD cover 255 so that lateral cover protuberance 256 fits into lateral cover protuberance groove 256a. Screw 258 may be fastened. Detachment preventing threshold 255a may project inside HDD cover 255 at an opposite end that HDD 254 is connected to main board 180. Accordingly, electrical decoupling of HDD 254 and main board 180 may be prevented.

FIGS. 14–20 illustrate an exemplary insulating and separating structure for the HDD. Insulating and separating structure can include an insulating film 260 for insulating the HDD 254, a film fixing plate 261 of a "/" shape for fixing the insulating film 260 and a separating knob 262 for separating the HDD 254. The insulating film 260 can be configured such that the size of the film is the same as that of an upper plane of the HDD and fixing portions 260a on both sides of the film could be folded. Both sides of the film fixing plate 261 are bent inward and an attaching/detaching protuberance through hole 261a can be formed on the bent portions in response to the attaching/detaching protuberance 254a of the HDD.

Figure 15:
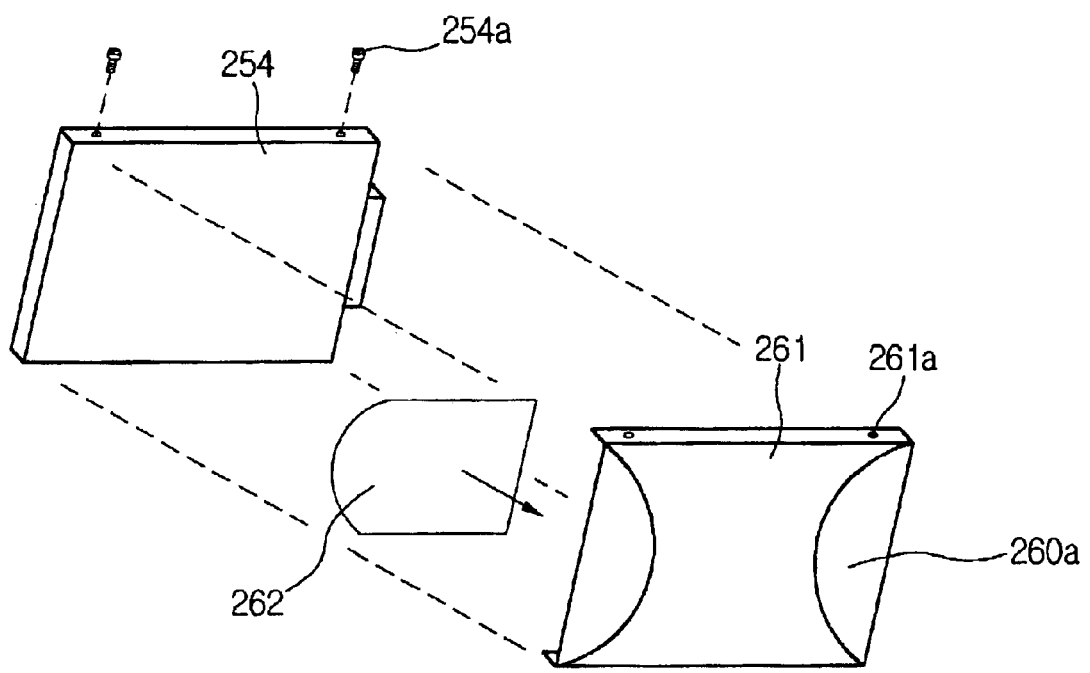
FIG. 15 through FIG. 17 are exemplary drawings illustrating joining process for insulating and separating structure of a hard disk.
Figure 16:
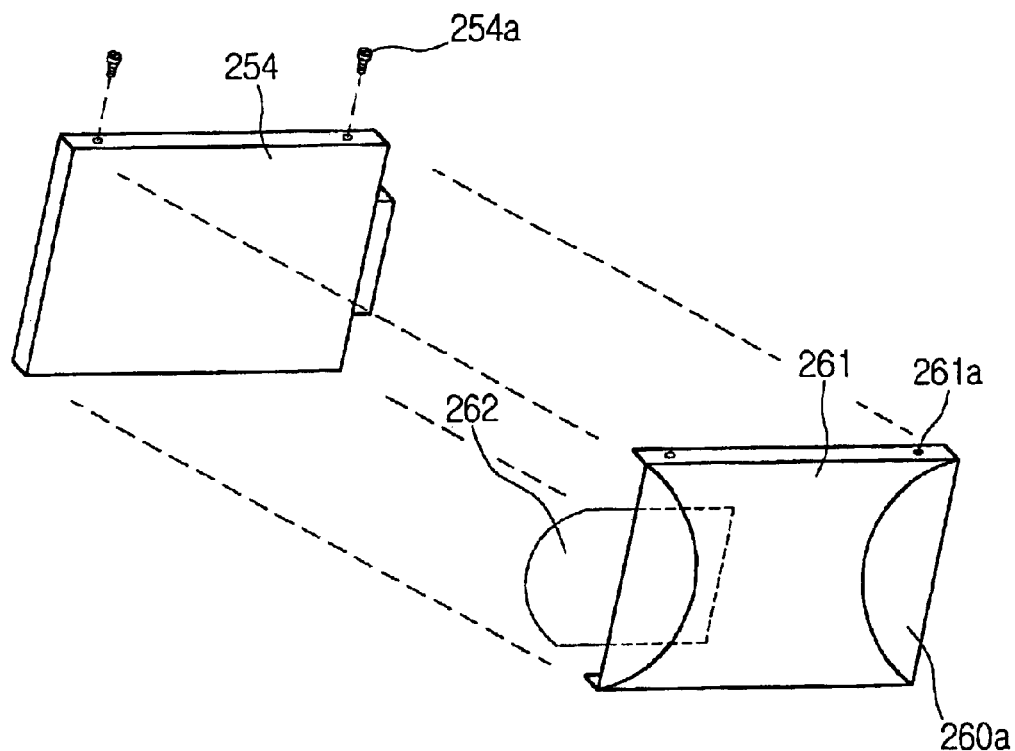

As shown in FIG. 15, a central portion of the insulating film 260 is preferably fastened (e.g., stuck) on an inner side of the film fixing plate 261 and the fixing portions 260a on both sides of the insulating film 260 can be folded and stuck onto both sides of the film fixing plate 261 by an adhesive or the like. In the insulating film 260 stuck on the inner side of the film fixing plate 261, the separating knob 262 can be attached to the opposite side to a side where the HDD 254 is connected to the female connecter, and a part of the separating knob 262 is preferably exposed to an exterior of the insulating film fixing plate 261 as shown in FIG. 16.

Figure 17:
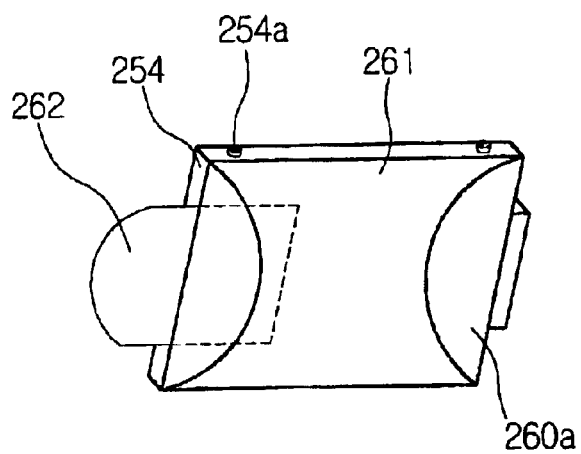

The insulating film fixing plate 261 to which the insulating film is attached, can be stuck on an upper plane and right and left planes of the HDD 254, and is preferably affixed in the HDD 254 if the attaching/detaching protuberance 254a is fastened to the attaching/detaching protuberance through hole 261a as shown in FIG. 17. The attaching/detaching protuberance 254a can be a screw or the like.

If a plurality of the attaching/detaching protuberances 254a is removed from the HDD 254 and the film fixing plate 261 is positioned on an upper portion of the HDD 254 and a plurality of the removed attaching/detaching protuberances 254a is positioned again and fastened to a plurality of the attaching/detaching protuberance through holes 261a, then the film fixing plate 261 is preferably stuck on and joined to the HDD 254 as one body. The insulating film 260 can be put between a circuit element of the HDD 254 and the film fixing plate 261, and the separating knob 262 can be exposed to an exterior of the HDD 254.

Figure 18:
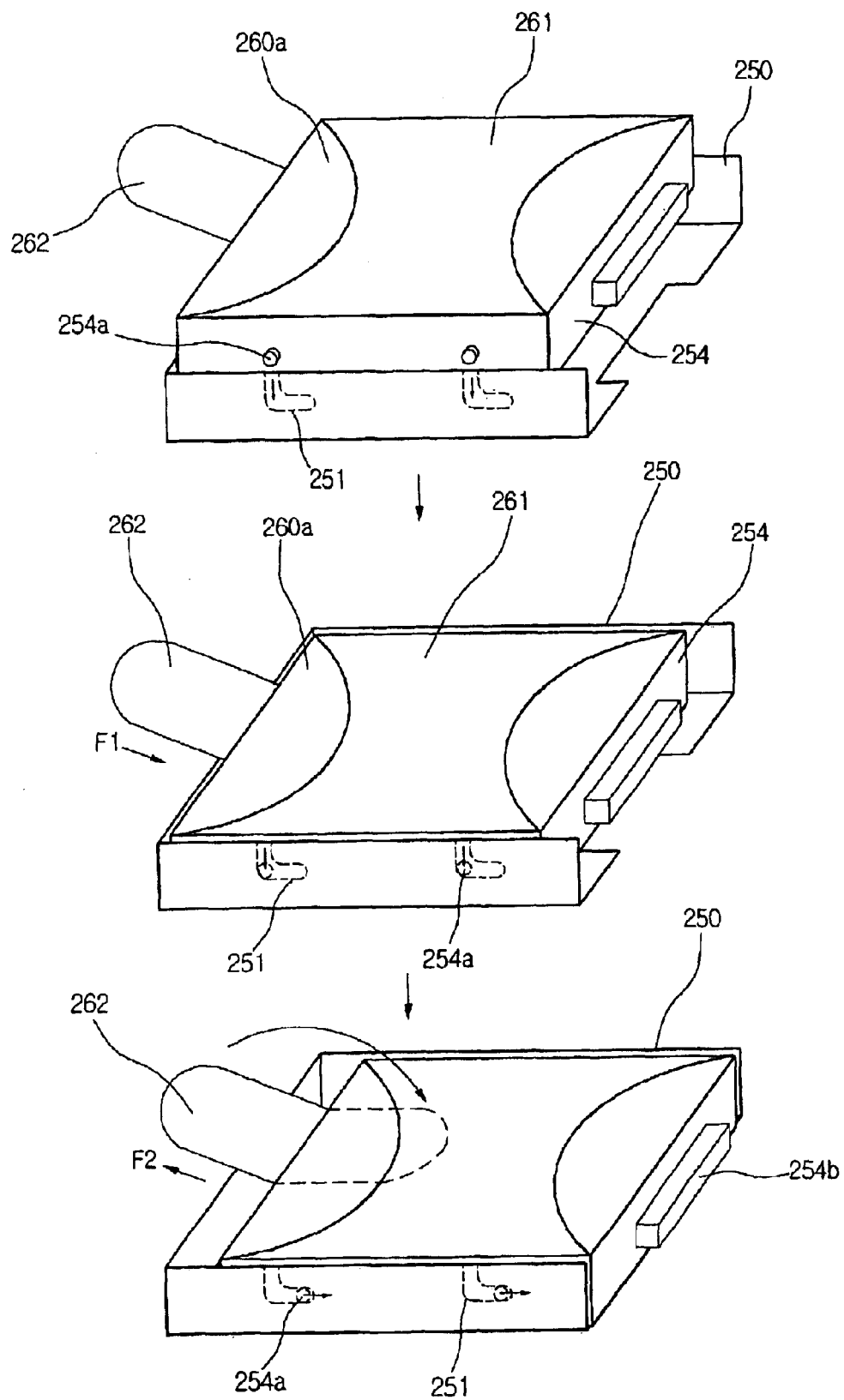
FIG. 18 is an exemplary drawing illustrating a status where a hard disk driver is operated to join to a bracket in a sliding manner.

As shown in FIG. 18, such HDD 254 can be positioned on the HDD bracket 250, and if the HDD 254 is pushed in a direction of force F1, then the attaching/detaching protuberances 254a of the HDD 254 can progress or slide to a first direction and then a second direction of force F1 along the attaching/detaching protuberance guiding groove 251 of the HDD bracket 250 and joined to the HDD bracket accordingly. As the HDD 254 is joined to the HDD bracket 250, mutual connection between the connectors can be directly achieved.

Figure 19:
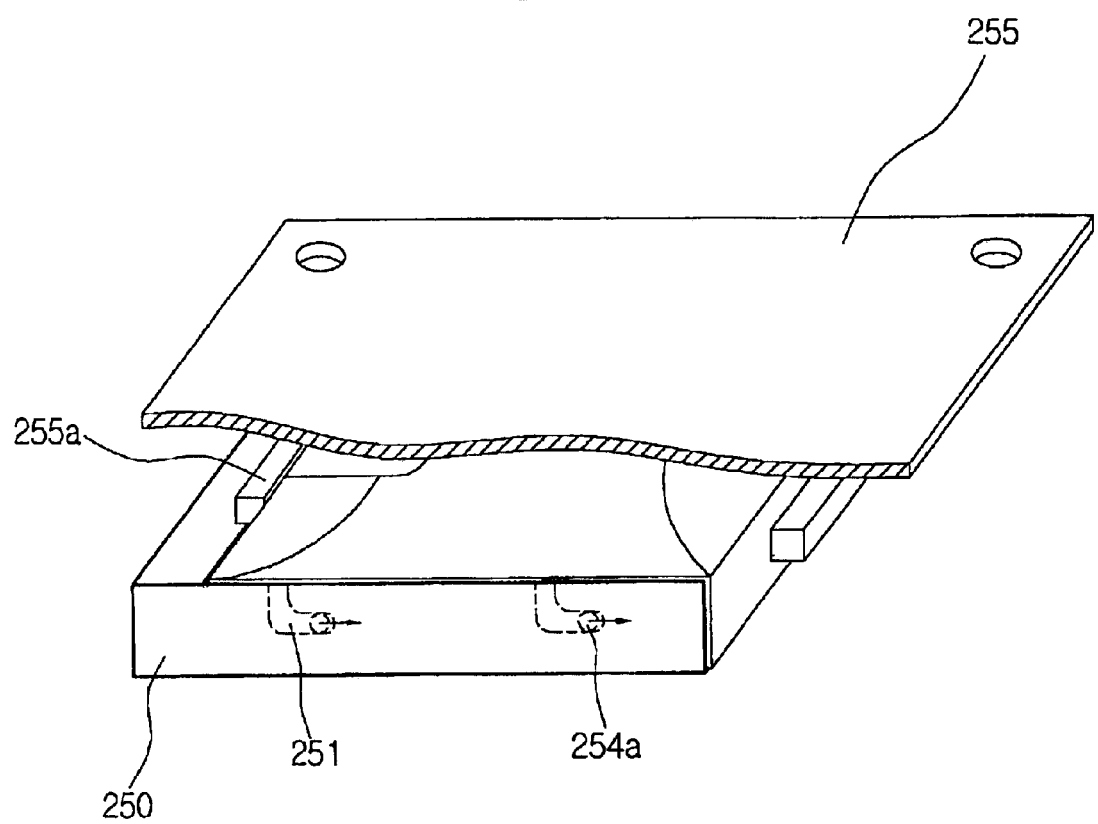
FIG. 19 is an exemplary drawing illustrating a joining status of a hard disk.

As shown in FIG. 19, the HDD bracket 250 on which the HDD 254 is mounted can be covered with the cover 255, whereby detachment of the HDD 254 can be prevented or made difficult by the detachment preventing threshold 255a or the like. As the HDD separating knob 262 is preferably positioned on an interior of the HDD cover 255, the separating knob 262 can be exposed to the outside if the HDD cover 255 is removed, as shown in FIG. 17. If the exposed separating knob 262 is pulled, the connecters are mutually separated and the HDD 254 is detached in a reverse or backward direction of force F2 from the HDD bracket 250 and thereby separated. As described above, separation of the HDD can be easily achieved. Insulating film 260 protects the HDD 254 from external impulse or electrical shock including via the film fixing plate 261. For embodiments, the separating knob could be attached or joined to a position having no electrical influence on the HDD.

Figure 20A:
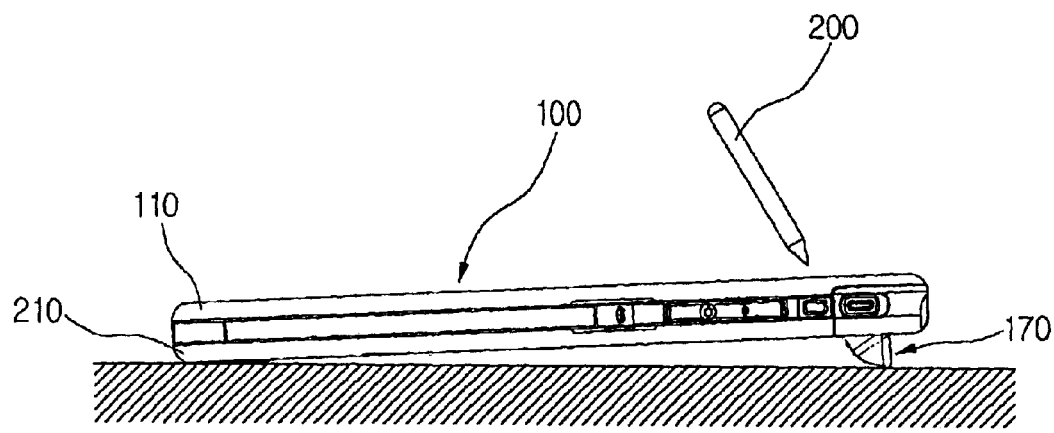
FIGS. 20(a)–(b) are exemplary drawings illustrating an operating status of a slope angle adjusting unit.
Figure 20B:
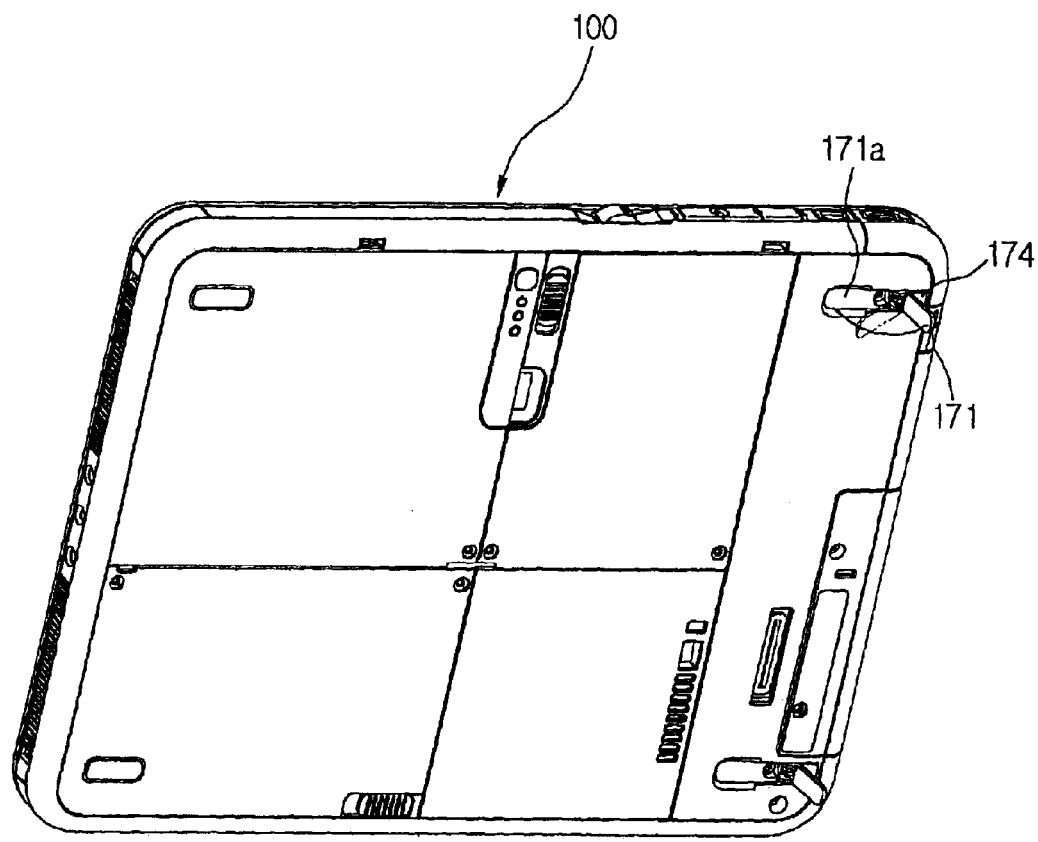

In case that the web pad is used oriented by a long edge or a short edge, a slope angle adjusting unit for providing the web pad with a predetermined slope with respect to a floor, can be joined. FIG. 20 through FIG. 23 are drawings illustrating an exemplary slope angle adjusting unit for the web pad according to embodiments of the present invention. FIG. 20(a) is a drawing illustrating a status where a slope angle is used by the web pad according to the slope angle adjusting unit, and the FIG. 20(b) is a drawing illustrating the slope angle adjusting unit joined to the rear side of the web pad. Such web pad (e.g., a portable computer) can be used in a landscape mode or a portrait mode depending on use modes. At the moment, for convenience of a user, the slope angle adjusting unit capable of adjusting the whole slope angle with respect to a use direction of the web pad, could be provided. For embodiments, the slope angle adjusting units 170 can be installed on both sides of the back upper portion of the rear cover 210 in order to adjust a slope in case that the web pad is used in a long edge (or a short edge based on the installed locations of the units 170). As shown in FIGS. 20(a)–20(b), such slope angle adjusting unit 170 is for adjusting a panel slope angle in using the web pad in a long edge.

Figure 21:
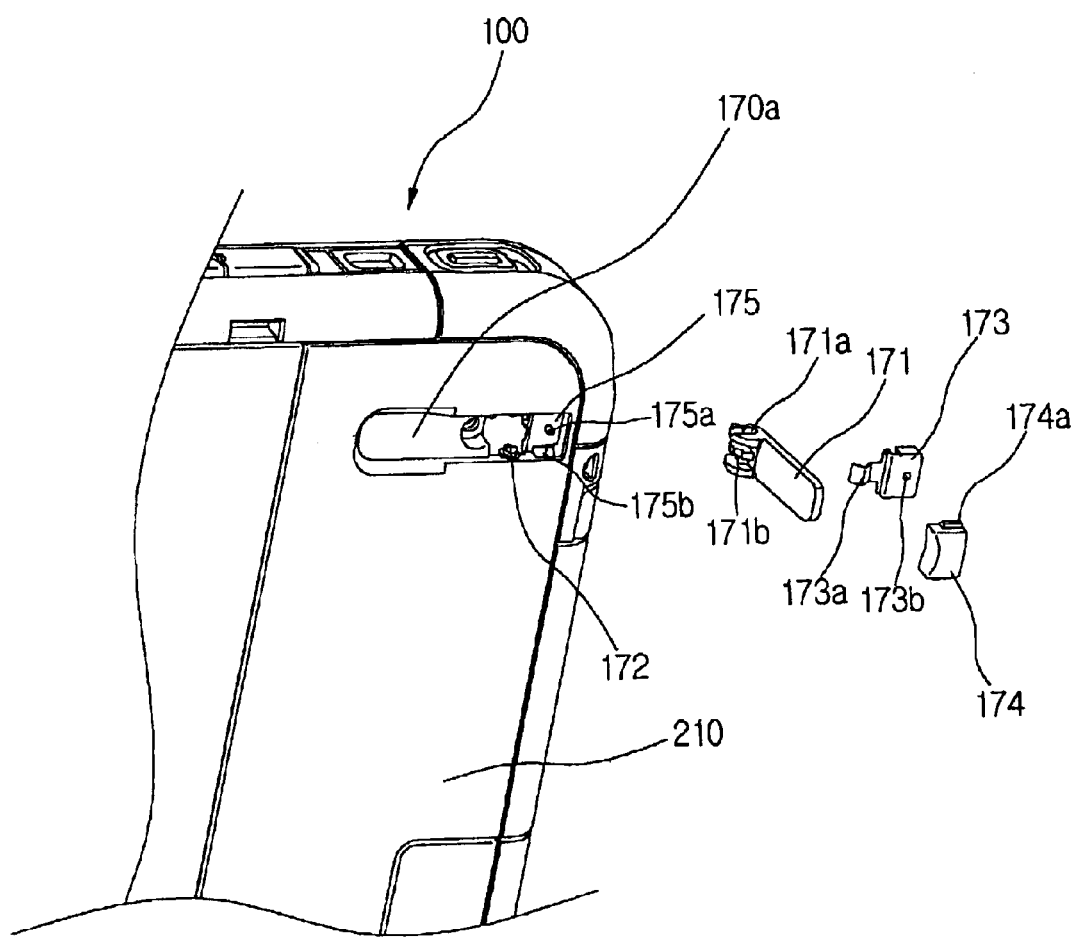
FIG. 21 is an exemplary exploded perspective view of a slope angle adjusting unit.

Referring to FIGS. 21 and 22, the slope angle adjusting unit can include a slope angle adjusting lever 171 for rotating back and forth as much as a predetermined angle with respect to a floor or flat surface from the back side of the rear cover 210, a rotational shaft 172 for rotation of the slope angle adjusting lever, a plate spring 173 bent at a predetermined slope angle of the slope angle adjusting lever 171 for transferring elastic force in order to adjust turning over of the lever and a stopper 174. The stopper 174 is preferably for stopping the slope angle adjusting lever 171 at a predetermined slope angle.

A rotational shaft receiving groove 171a to which right and left rotational shafts 172 are joined, and a elastic slice hooking protuberance 171b for cooperating with a elastic slice depending on turning over of the lever, can be formed on a head portion of the slope angle adjusting lever 171, respectively. A body portion of the plate spring 173 is preferably safely seated on a safely seating portion 175 for the plate spring and right and left hooking protuberances 173c of the plate spring 173 can be hooked at inner thresholds on the safely seating portion for the plate spring and joined together. The elastic slice 173a bent in two steps can be joined in a "V" shape to the elastic slice hooking protuberance 171b on the slope angle adjusting lever 171. The stopper 174 can be joined to the safely seating portion 175 for the plate spring in a forced fitting manner, in which stopper fixing protuberances 174a projected outward on opposing sides (e.g., right and left) of the stopper can be fit into stopper fixing protuberance grooves 175b formed on corresponding positions (e.g., right and left) of the safely seating portion 175 for the plate spring.

The safely seating portion 175 for the plate spring is preferably formed on an upper portion of a lever joining groove 170a. A stopper supporting protuberance 175a can be projected upward on a central portion of the safely seating portion 175 so that the stopper supporting protuberance 175a passes through a supporting protuberance through hole 173b formed on a body of the plate spring 173, and can be fit into a central portion of the stopper 174, whereby movement of the stopper 174 is limited or prevented.

Figure 22A:
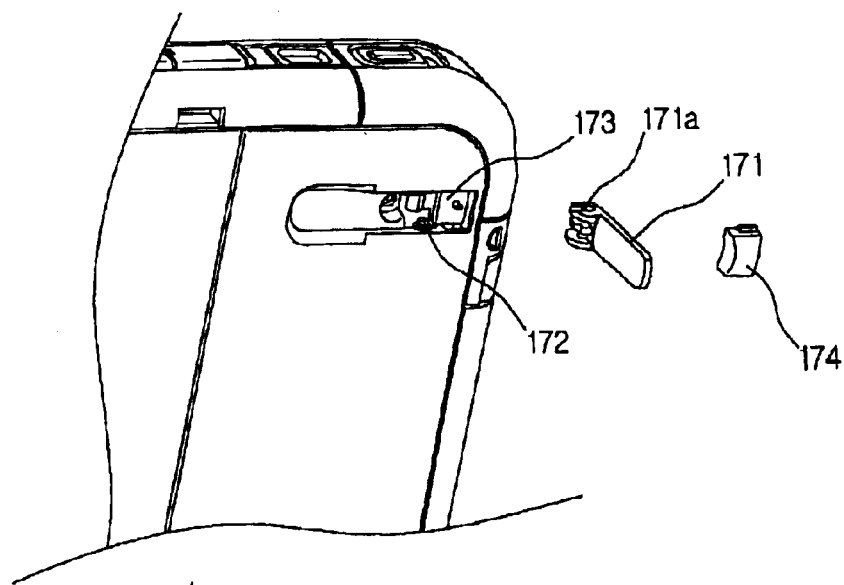
FIGS. 22(a)–(c) are exemplary drawings illustrating joining process of a slope angle adjusting unit.
Figure 22B:
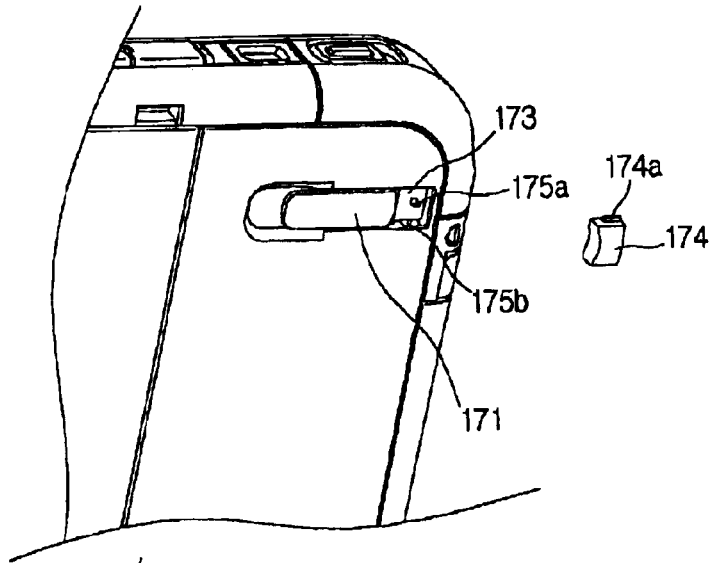

For joining of such slope angle adjusting unit to the rear cover, a body portion of the plate spring 173 is preferably safely seated on the safely seating portion 175 for the plate spring, formed at one side of the lever joining groove 170a in the upper portion of the rear cover, and the inner threshold of the safely seating portion 175 for the plate spring can be joined to the hooking protuberances 173c of the plate spring 173. Accordingly, the plate spring 173 can be safely seated and fixed in the safely seating portion 175 for the plate spring as shown in FIGS. 22(a) and 22(b).

The stopper supporting protuberance 175a projected upward on the central portion of the safely seating portion 175 for the plate spring can pass through the supporting protuberance through hole 173b formed on the central portion of the body of the plate spring 173 and project to the outside. Preferably, the stopper 174 is positioned and fit on the safely seating portion 175 for the plate spring in a forced fitting manner, and the right and left stopper fixing protuberances 174a are fit into the stopper fixing protuberance grooves 175b. At the same time, the stopper supporting protuberance 175a can be fit into a central supporting groove of the stopper 174. With the foregoing construction and as described above, a structure of the slope angle adjusting unit can be completed.

Figure 22C:
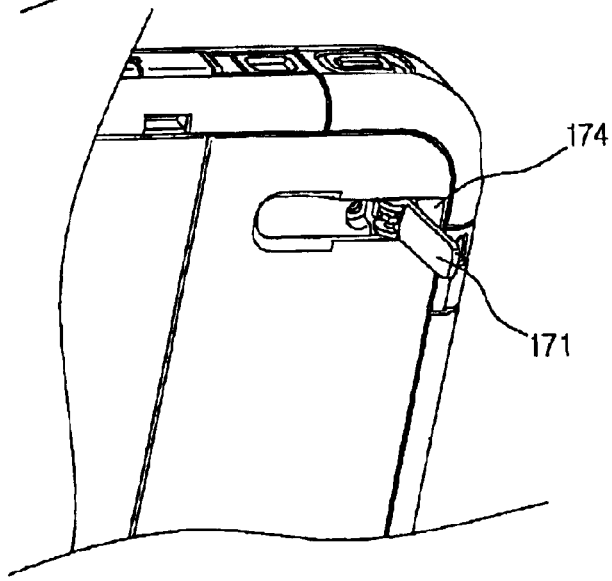

If the rotational shaft 172 is positioned at lever attaching/detaching grooves formed on opposing sides (e.g., right and left) on the head portion of the slope angle adjusting lever 171, and the slope angle adjusting lever 171 is pushed in an inner direction, then the rotational shaft receiving groove 171a can be joined to the rotational shaft 171 as shown in FIG. 22(c). The elastic slice 173a extended from one side of the plate spring 173 can be joined to the elastic slice hooking protuberance 171b formed on an upper portion of the head of the slope angle adjusting lever 171, and the slope angle adjusting lever 171 is preferably safely seated on the lever joining groove 170a, whereby the slope angle adjusting lever 171 is completely joined or removably attached to the rear cover 210.

As shown in FIG. 23, when the web pad is used at a predetermined slope angle, if the slope angle adjusting lever 171 mounted on the back of the rear cover is pulled as much as a predetermined angle, then the elastic slice hooking protuberance 171b formed on an upper portion of the slope angle adjusting lever 171, preferably delivers elastic force in a direction opposite to the desired rotational direction due to the elastic slice 173a of the plate spring 173. Accordingly, the slope angle adjusting lever 171 pivoting on the rotational shaft 172 can move in a desired rotational direction by itself, before coming into contact with the stopper 174 or being stopped when the elastic slice hooking protuberance 171b would be moved in the opposite direction. For the stopper 174, rubber material or the like can be used for buffering and stoppage of the slope angle adjusting lever 171.

Figure 23A:
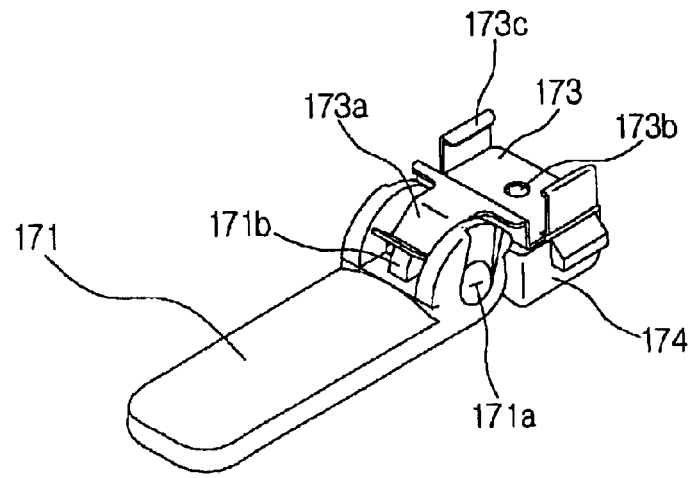
FIGS. 23(a)–(c) are exemplary drawings illustrating an operating status of a slope angle adjusting unit.
Figure 23B:
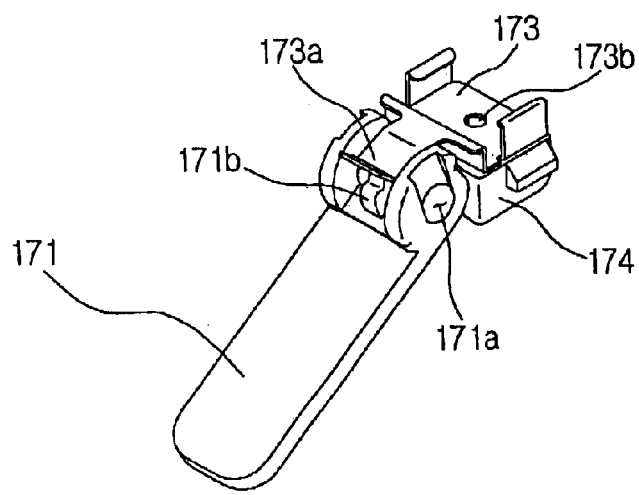
Figure 23C:
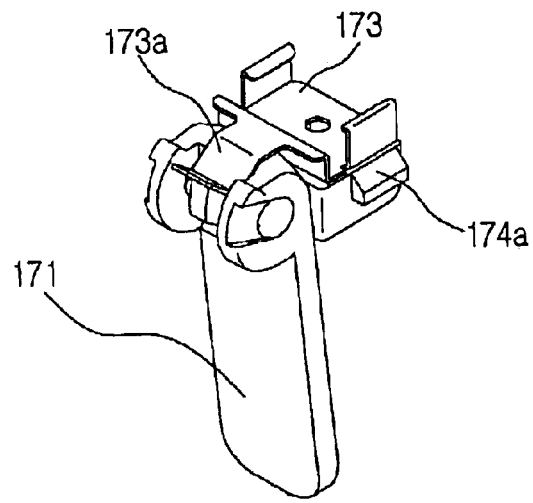

For rotating to status of FIG. 23(a) and FIG. 23(c) from a status of FIG. 23(b), the elastic slice hooking protuberance 171b and the elastic slice 173a are mutually joined in a "V" shape, preferably delivering force of opposite direction with respect to the rotational shaft 172 when the slope angle adjusting lever 171 is moved as much as a predetermined angle by the rotational shaft 172. By such operations the slope angle adjusting lever 171 can be folded and unfolded.

Therefore, as shown in FIG. 20(b), the web pad can be used, at a position inclined by a predetermined angle set in accordance with the slope angle adjusting unit. Alternatively, as shown in FIG. 23(a), the web pad can be used without a slope angle with respect to a floor or supporting base by the slope angle adjusting unit 170. In that case, if the slope angle adjusting lever 171 is pulled back to the original position from a status of FIG. 23(b), force opposite to a direction of coming back to the original position is preferably delivered to the elastic slice hooking protuberance 171b on the head portion of the slope angle adjusting lever 171 by the elastic slice 173a of the plate spring 173, whereby the slope angle adjusting lever 171 can be inserted into the lever joining groove 170a by pushing force of the elastic slice 173a.

As described above, if the slope angle adjusting lever 171 is unfolded as much as a predetermined slope angle in order for adjustment of the slope angle of the web pad, the slope angle adjusting lever is unfolded as much as a desired slope angle by the inner elastic slice 173a and the elastic slice hooking protuberance 171b so that the web pad can be used at a desired slope angle. Alternatively, if the slope angle adjusting lever 171 is pulled back in order to eliminate a slope angle by the slope angle adjusting lever 171, then the slope angle adjusting lever 171 is inserted into the lever joining groove 170a of the rear cover 210 by the inner elastic slice 173a and the elastic slice hooking protuberance 171b so that the web pad can be used without a slope angle.

As the rotational shaft receiving groove 171a for attaching to and detaching from the slope angle adjusting lever 171, is formed on both sides of the head of the slope angle adjusting lever 171, the rotational shaft receiving groove 171a can be separated from the rotational shaft 172 if the slope angle adjusting lever 171 is erected upright and pulled back by a user or the like. Namely, as the rotational shaft receiving groove 171a of the slope angle adjusting lever 171 can be forcibly fit in the rotational shaft, the slope angle adjusting lever 171 can be separated if pulled back from the rotational shaft 172.

As described above, embodiments of a portable computer of multifunction type in accordance with the present invention have various advantages. An LCD panel, a digitizer panel, and a main board for system operation can be joined in a form of one single pad on a web pad. A button assembly for control of a variety of functions, a HDD attaching/detaching unit, a battery attaching/detaching unit, a stylus holder for receiving and providing a stylus, and a slope angle adjusting unit for adjusting the slope angle of the web pad, can be joined on the rear cover. Accordingly, a single web pad for performing functions of the portable computer can be provided. A keyboard part attachable and detachable to and from the web pad can be joined to the web pad, or the web pad could be interfaced through a communication port. Therefore, the web pad could be used as a notebook computer.

The web pad could be carried independently and used together with the stylus 200, and the keyboard could be selectively mounted on the web pad 100 so that the web pad could be used with the keyboard, the mouse and the stylus 200, whereby a user possibly input a desired character on the web pad using the stylus 200 in case of editing a simple document or accessing to the web sites, and a user possibly performs a relevant function by selecting a specific menu with the stylus 200. For example, upon input of desired character or selection of a specific menu with use of the stylus 200, a coordinate of the digitizer panel corresponding to a high frequency signal (e.g., RF signal) generated in the stylus 200, is decoded at a digitizer's control unit, then transferred to the main board 180. The main board 180 controls to perform operation in response to the input information.

If a key signal is input through input units such as the keyboard and the mouse, the key signal input through the USB port and the keyboard connector, can be transferred to a central processing part through the USB bus. The central processing part displays relevant information on the LCD panel 121 in response to the key signal. In case that only such web pad 100 is used, if display information is changed into a desired display mode, then the display mode is changed into the portrait mode or the landscape mode. Namely, in case that 1024*768 or 768*1024 is selected from the display information, the display status is changed into the relevant display mode.

Accordingly, embodiments of the present invention can provide a portable computer of a multifunction type capable of installing a plurality of display panels and a system main machine to perform functions of a web pad and a notebook computer. Embodiments of the present invention can provide a portable computer of a multifunction type capable of installing a panel on a front cover, and having a button assembly for controlling a variety of functions, attaching/detaching unit for a power switch and a hard disk drive, a stylus holder, a slope angle adjusting unit on a rear cover in one body. Embodiments of the present invention can provide a portable computer of a multifunction type capable of conveniently performing maintenance and repairing for the product by separately joining devices installed within the front cover and the rear cover.

Embodiments of a portable computer of multifunction type can include a front cover having a tempered glass stuck on its front side with an interior that can mount different kinds of display panels spaced to a predetermined extent from the tempered glass, an opposite rear cover with an interior on which a main board for operating can be mounted. Further, a button assembly can control a variety of functions, a power switch for on/off status of the power supply, a stylus holder can receive and provide a stylus in a push-push manner can be provided on a first corresponding side of the rear cover, and a HDD (Hard Disk Drive) attaching/detaching unit for attaching/detaching a HDD can be provided on the other side of the rear cover.

Embodiments of the present invention could provide a notebook type computer for possibly performing function of a computer using a single pad and convenient to carry by installing a LCD (Liquid Crystal Display) panel, a digitizer panel, and a main system for system operation of these panels in one single pad. Also, embodiments of the present invention can have an effect of conveniently performing maintenance and repairing by installing the display panel on the front cover, and installing the main board for operating the system with the button assembly, the HDD, the battery, and the stylus holder on the rear cover, and constructionally separating the front cover from the rear cover.

Embodiments of the present invention can have an effect of performing fastening work simply by fastening the button assembly in a hook manner. Embodiments of the present invention can have an effect of performing joining without screw fastening work in joining the HDD by joining the HDD in a sliding manner. Embodiments of the present invention can have an effect of reducing or minimizing loss of the stylus due to detachment of the stylus by providing a push-push method for a receiving/providing of the stylus from the stylus holder installed within an inside of the cover, while maintaining clean appearance, for the stylus holder is installed on the inside of the cover.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for connecting a peripheral device to a main device comprising:
   a peripheral device; and
   a bracket, wherein the bracket is configured to:
      rigidly attach the peripheral device to the main device; and
      guide the peripheral device into electrical contact with the main device, wherein the bracket comprises at least one groove, and the at least one groove is configured to receive at least one protrusion of the peripheral device, and wherein the peripheral device travels in a first direction then a second direction substantially perpendicular to the first direction along the least one groove.

2. The apparatus of claim 1, wherein the peripheral device is a hard disk.

3. The apparatus of claim 1, wherein the main device is a computer.

4. The apparatus of claim 1, wherein the groove is L shaped.

5. The apparatus of claim 1, wherein the peripheral device is in direct electrical contact with the main device when the at least one protrusion of the peripheral device is positioned at an end of the at least one groove.

6. The apparatus of claim 1, wherein the interface between the main device and the peripheral device is a rigid direct connection between the main device and the peripheral device.

7. The apparatus of claim 3, wherein the main device is a portable computer.

8. The apparatus of claim 3, wherein the main device has a display with a viewable area greater than 10 inches in—at least one dimension.

9. An apparatus comprising:
   a computer;
   a hard disk; and
   means for rigidly attaching the hard disk to the computer and guiding the hard disk into electrical contact with the computer.

10. A portable computer comprising a HDD attaching/detaching unit comprising:
    a HDD bracket configured to receive a HDD and fasten the HDD to a rear cover, wherein the HDD bracket is configured with a connector for connection of the HDD to the portable computer, wherein the HDD is configured to attach to and detach from the HDD bracket; and
    a plurality of attaching/detaching protuberances and attaching/detaching protuberance guiding grooves formed corresponding to each other on both sides of the HDD and the HDD bracket, respectively, wherein the attaching/detaching protuberance guiding grooves are formed in a "L" shape so that the attaching/detaching protuberances are joined into the attaching/detaching protuberance guiding grooves in a sliding manner.

11. The portable computer according to claim 10, wherein the attaching/detaching protuberance guiding grooves are formed on the HDD bracket, and the attaching/detaching protuberances are formed on the HDD.

12. The portable computer according to claim 10, wherein the HDD is in direct electrical contact with the portable computer when at least one protuberance of the HDD is positioned at an end of the corresponding groove.

13. The portable computer according to claim 10, wherein a length of the HDD bracket is a sum of a length of the HDD and a length of the attaching/detaching protuberance guiding groove of a "L" shape.

14. The portable computer according to claim 10, wherein the attaching/detaching protuberances project from an outer side of the HDD and are formed in a screw joining manner, so that a sticking strength between the HDD bracket and the HDD is variable depending on adjustment of a screw length.

15. The portable computer according to claim 10, wherein the HDD attaching/detaching unit further comprises a HDD cover configured with a detachment preventing threshold positioned on a rear end of the HDD in order to cover the HDD joined to the HDD bracket and to prevent the connecter connection from being disconnected.

16. The portable computer according to claim 10, wherein the HDD bracket and the HDD cover are joined to the rear cover by a hook and a hook hooking groove.

17. The portable computer according to claim 10, wherein the HDD attaching/detaching unit comprises:
    an insulating film configured to insulate the HDD joined to the HDD bracket;
    a film fixing plate exposed to the outside at a first side, having a second opposing attached to the insulating film, and right and left sides joined to a guiding protuberance of the HDD, wherein the film fixing plate is joined to a back side of the HDD.

18. The portable computer according to claim 10, wherein an interface between the portable computer and the HDD is configured to be a rigid direct connection between the HDD and the portable computer.

19. The portable computer according to claim 17, wherein the HDD attaching/detaching unit further comprises a HDD cover joined to an exterior of the HDD bracket on the rear cover, wherein the HDD cover includes a detachment preventing threshold on an inner rear portion configured to contact with a rear portion of the HDD to prevent the HDD received in the HDD bracket from moving in a backward direction.

20. The portable computer according to claim 17, wherein the HDD attaching/detaching unit further comprises a separating knob attached to the film fixing plate and configured to separate the HDD from the HDD bracket.

21. The portable computer according to claim 20, wherein the separating knob is attached to the insulating film by a first side and has a second side exposed to the outside.

22. An HDD attaching/detaching unit for attaching/detaching an HDD to a main device, comprising:
    a HDD bracket configured to receive an HDD and fasten the HDD to a main device, wherein the HDD bracket comprises a connector for electrical connection of the HDD to the main device, wherein the HDD is configured to attach to and detach from the HDD bracket; and
    a plurality of attaching/detaching protuberances and attaching/detaching protuberance guiding grooves formed corresponding to each other on both the HDD and the HDD bracket, respectively.

23. The HDD attaching/detaching unit of claim 22, wherein the attaching/detaching protuberance guiding grooves are formed in a "L" shape so that the attaching/detaching protuberances are joined into the attaching/detaching protuberance guiding grooves in a sliding manner.

24. The HDD attaching/detaching unit of claim 22, wherein the attaching/detaching protuberance guiding grooves are formed on the HDD bracket, and the attaching/detaching protuberances are formed on the HDD.

25. The HDD attaching/detaching unit of claim 22, wherein the HDD is in direct electrical contact with the main device when at least one protuberance of the HDD is positioned at an end of the corresponding groove.

26. The HDD attaching/detaching unit of claim 22, wherein the attaching/detaching protuberances project from an outer side of the HDD and are formed in a screw joining manner, so that a sticking strength between the HDD bracket and the HDD is variable depending on adjustment of a screw length.

27. The HDD attaching/detaching unit of claim 22, wherein the HDD attaching/detaching unit further comprises a HDD cover configured with a detachment preventing threshold positioned on rear end of the HDD in order to cover the HDD joined to the HDD bracket and to prevent connecter connection from being disconnected.

28. The HDD attaching/detaching unit of claim 22, further comprising:
    an insulating film configured to insulate the HDD joined to the HDD bracket;
    a film fixing plate exposed to the outside on a first side, having a second opposing side attached to the insulating film, and right and left sides joined to a guiding protuberance of the HDD, wherein the film fixing plate is joined to a back side of the HDD.

29. The HDD attaching/detaching unit of claim 23, wherein a length of the HDD bracket is a sum of a length of the HDD and a length of the attaching/detaching protuberance guiding groove of a "L" shape.

30. The HDD attaching/detaching unit of claim 28, wherein the HDD attaching/detaching unit further comprises a separating knob attached to the film fixing plate and configured to separate the HDD from the HDD bracket.

31. An apparatus for connecting a peripheral device to a main device comprising:
    a bracket, wherein the racket is configured to:
        rigidly attach peripheral device to the main device; and
        guide the peripheral device into electrical contact with the main device, wherein the bracket comprises at least one groove, and the at least one groove is configured to receive at least one protrusion of the peripheral device, and wherein the peripheral device travels in a first direction then a second direction substantially perpendicular to the first direction along the at least one groove.

32. An apparatus for connecting a peripheral device to a main device comprising:
    a peripheral device; and
    a bracket, wherein the bracket is configured to:
        rigidly attach e peripheral device to the main device; and
        guide the peripheral device into electrical contact with the main device, wherein the bracket comprises at least one groove, and the at least one groove is configured to receive at least one protrusion of the peripheral device, and wherein the peripheral device is in direct electrical contact with the main device when the at least one protrusion of the peripheral device is positioned at an end of the at least one groove.

33. The apparatus of claim 32, wherein the peripheral device travels in a first direction then a second direction different from the first direction along the at least one groove.

* * * * *